United States Patent
Miyoshi

(10) Patent No.: US 9,854,238 B2
(45) Date of Patent: Dec. 26, 2017

(54) VIDEO ENCODING APPARATUS, VIDEO ENCODING METHOD, AND VIDEO ENCODING COMPUTER PROGRAM

(71) Applicant: FUJITSU LIMITED, Kawasaki-shi, Kanagawa (JP)

(72) Inventor: Hidenobu Miyoshi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 323 days.

(21) Appl. No.: 14/644,310

(22) Filed: Mar. 11, 2015

(65) Prior Publication Data

US 2015/0264351 A1    Sep. 17, 2015

(30) Foreign Application Priority Data

Mar. 12, 2014  (JP) ................................. 2014-048934

(51) Int. Cl.
| | |
|---|---|
| *H04N 19/107* | (2014.01) |
| *H04N 19/167* | (2014.01) |
| *H04N 19/139* | (2014.01) |
| *H04N 19/176* | (2014.01) |
| *H04N 19/91* | (2014.01) |

(52) U.S. Cl.
CPC ......... *H04N 19/107* (2014.11); *H04N 19/139* (2014.11); *H04N 19/167* (2014.11); *H04N 19/176* (2014.11); *H04N 19/91* (2014.11)

(58) Field of Classification Search
CPC .................................................. H04N 19/107
See application file for complete search history.

(56) References Cited

U.S. PATENT DOCUMENTS

| | | | |
|---|---|---|---|
| 5,815,209 | A | 9/1998 | Kondo et al. |
| 6,002,802 | A | 12/1999 | Chujoh et al. |

(Continued)

FOREIGN PATENT DOCUMENTS

| | | |
|---|---|---|
| JP | 07-135654 | 5/1995 |
| JP | 09-130807 | 5/1997 |

(Continued)

OTHER PUBLICATIONS

JPOA—Office Action of Japanese Patent Application No. 2014-048934 dated Sep. 19, 2017, with machine translation of the Office Action.

*Primary Examiner* — James Pontius
(74) *Attorney, Agent, or Firm* — Fujitsu Patent Center

(57) ABSTRACT

In a video encoding apparatus, an encoder for encoding a first region of a picture includes: an inhibited block identifying unit which identifies a first inhibit target sub-block that is contained within the first region and that may select a motion vector of a referenced block contained in a second region of an already encoded picture, the second region being a region encoded by another encoder, as a prediction vector for the motion vector of the first sub-block when an inter-predictive coding mode is applied; and a predictive encoding unit which uses a motion vector other than the motion vector of the referenced block as the prediction vector when encoding a second inhibit target sub-block by using the inter-predictive coding mode, wherein the second inhibit target sub-block is a sub-block that contains the first inhibit target sub-block and at which the inter-predictive coding mode is applied.

16 Claims, 22 Drawing Sheets

(56) References Cited

U.S. PATENT DOCUMENTS

| | | | |
|---|---|---|---|
| 6,259,736 B1* | 7/2001 | Chujoh | H04N 19/503 375/240.13 |
| 2004/0175049 A1* | 9/2004 | Yamamoto | H04N 19/61 382/236 |
| 2009/0016621 A1* | 1/2009 | Nakagawa | H04N 19/105 382/236 |
| 2010/0119156 A1 | 5/2010 | Noguchi et al. | |
| 2010/0189179 A1 | 7/2010 | Gu et al. | |
| 2013/0322542 A1* | 12/2013 | Senzaki | H04N 19/00587 375/240.16 |
| 2014/0247876 A1 | 9/2014 | Moriya et al. | |
| 2015/0146780 A1* | 5/2015 | Miyoshi | H04N 19/593 375/240.12 |
| 2015/0245059 A1 | 8/2015 | Terada et al. | |
| 2017/0006304 A1* | 1/2017 | Miyoshi | H04N 19/52 |

FOREIGN PATENT DOCUMENTS

| | | |
|---|---|---|
| JP | 10-276437 | 10/1998 |
| JP | 2000-165883 | 6/2000 |
| JP | 2006-295492 | 10/2006 |
| JP | 2009-049979 | 3/2009 |
| JP | 2011-172291 | 9/2011 |
| JP | 2015-159531 | 9/2015 |
| WO | 2010/088031 | 8/2010 |
| WO | 2013/065402 A1 | 5/2013 |

* cited by examiner

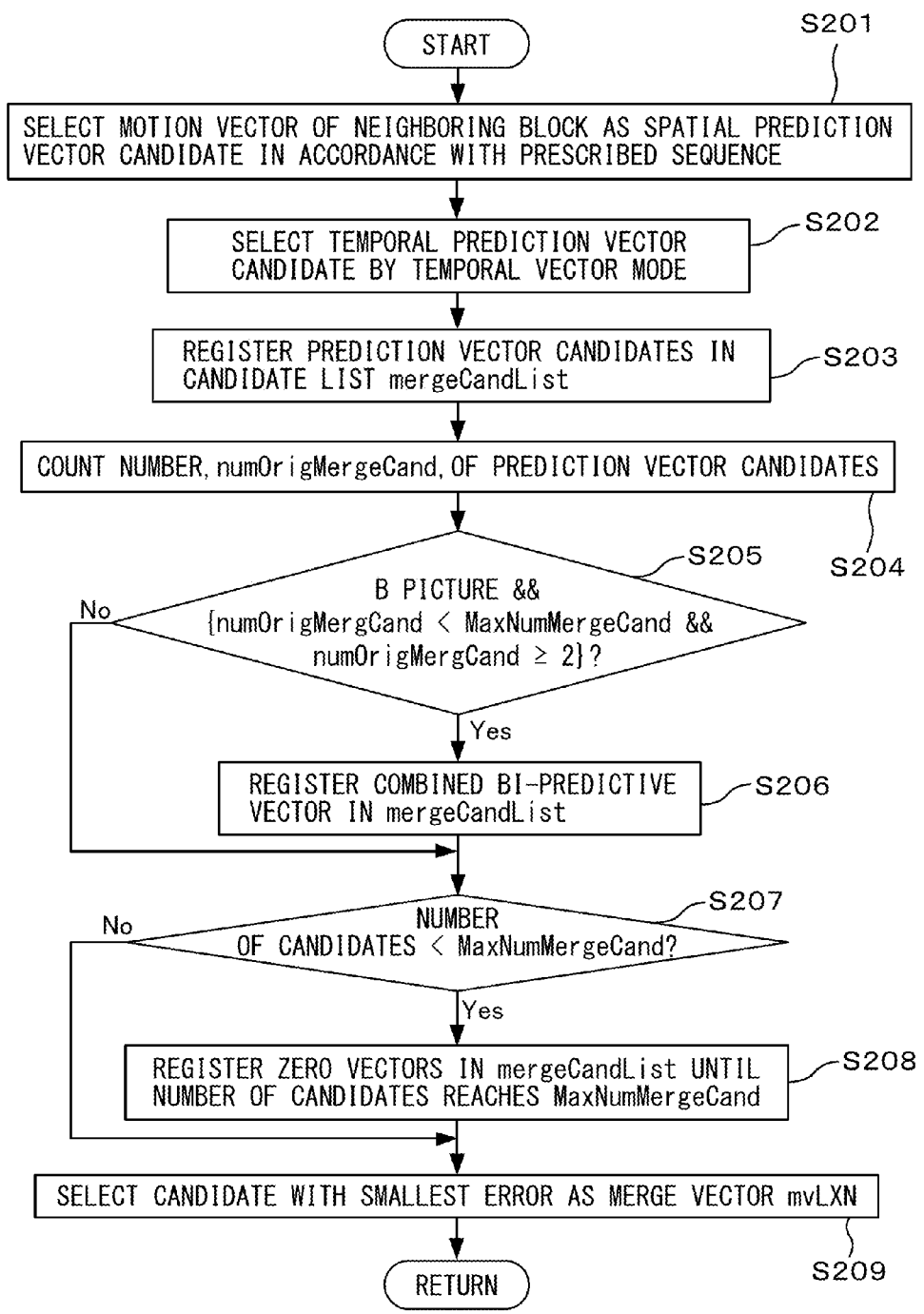

| combIdx | 0 | 1 | 2 | 3 | 4 | 5 | 6 | 7 | 8 | 9 | 10 | 11 |
|---|---|---|---|---|---|---|---|---|---|---|---|---|
| l0CandIdx | 0 | 1 | 0 | 2 | 1 | 2 | 0 | 3 | 1 | 3 | 2 | 3 |
| l1CandIdx | 1 | 0 | 2 | 0 | 2 | 1 | 3 | 0 | 3 | 1 | 3 | 2 |

800

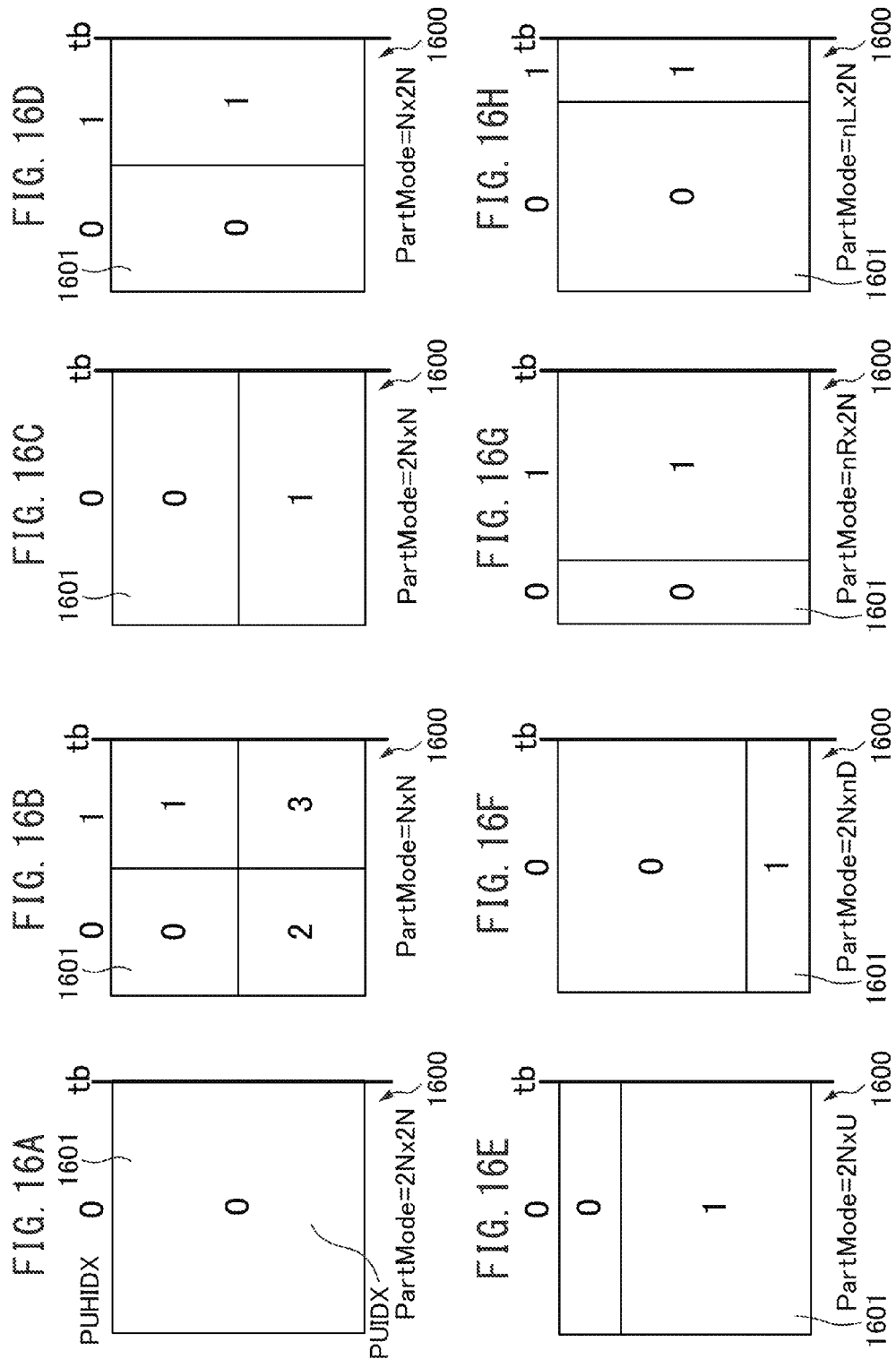

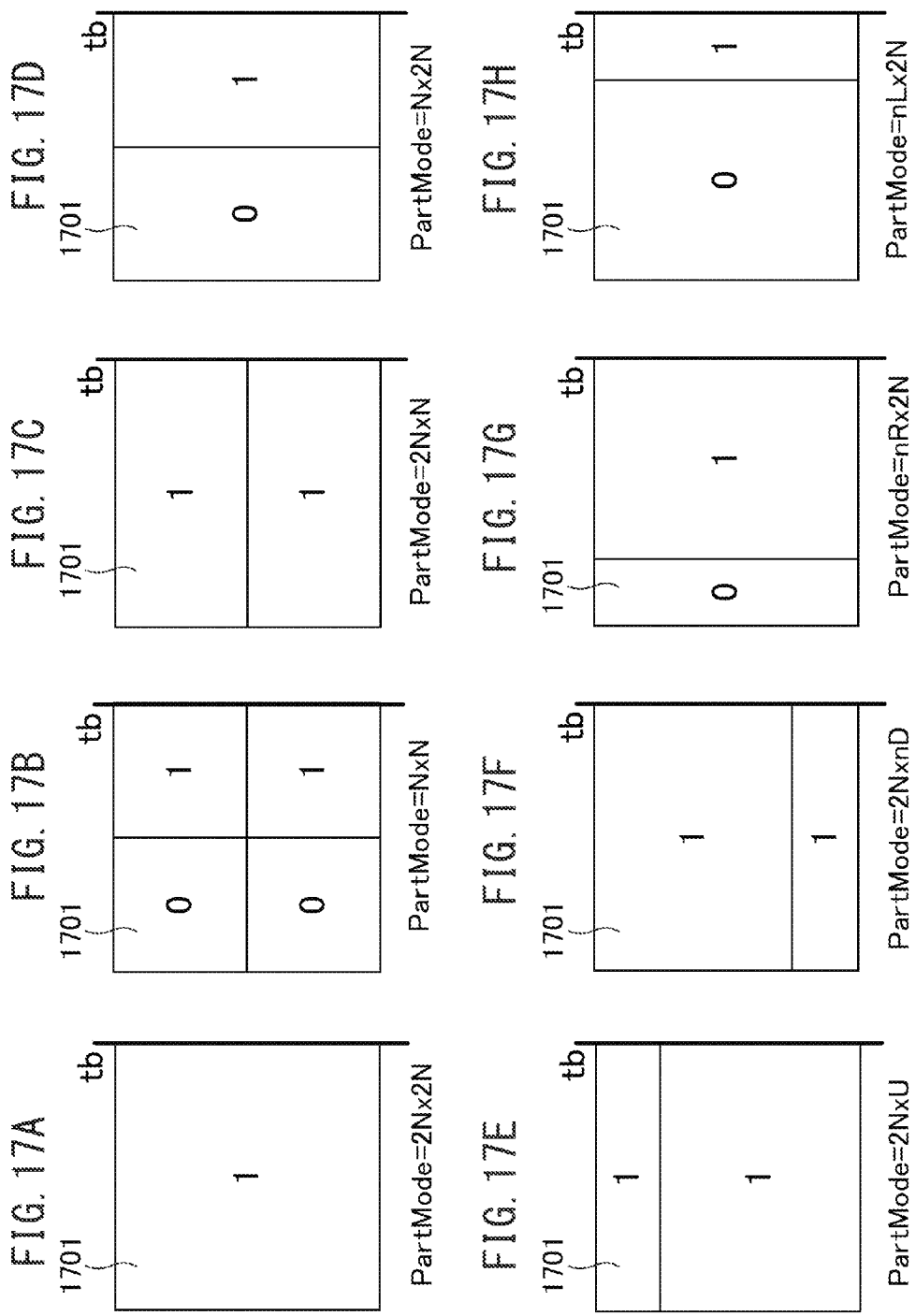

FIG. 18A  PartMode=2Nx2N
FIG. 18B  PartMode=NxN
FIG. 18C  PartMode=2NxN
FIG. 18D  PartMode=Nx2N
FIG. 18E  PartMode=2NxU
FIG. 18F  PartMode=2NxnD
FIG. 18G  PartMode=nRx2N
FIG. 18H  PartMode=nLx2N

VIDEO ENCODING APPARATUS, VIDEO ENCODING METHOD, AND VIDEO ENCODING COMPUTER PROGRAM

CROSS-REFERENCE TO RELATED APPLICATION

This application is based upon and claims the benefit of priority of the prior Japanese Patent Application No. 2014-048934, filed on Mar. 12, 2014, the entire contents of which are incorporated herein by reference.

FIELD

The embodiments discussed herein are related to a video encoding apparatus, video encoding method, and video encoding computer program for encoding a picture by dividing the picture into a plurality of regions.

BACKGROUND

Generally, the amount of data used to represent video data is very large. Accordingly, an apparatus handling such video data encodes the video data by using high-efficiency coding before transmitting the video data to another apparatus or before storing the video data in a storage device. "High-efficiency coding" refers to a coding process that converts a certain data stream into another data stream by compressing the amount of data of the data stream.

One known coding method employed in high-efficiency coding for video data is the intra-picture (intra-predictive) coding. This coding method exploits high spatial correlation existing within video data, and encodes a picture without using encoded images of other pictures. A picture encoded by the intra-picture predictive coding method can be decoded by using only information from itself.

Another known coding method employed in high-efficiency coding is the inter-picture (inter-predictive) coding. This coding method exploits the property that video data has high temporal correlation. Generally, in video data, a picture at a given instant in time and a picture that follows it are often highly similar to each other. The inter-predictive coding exploits this property of the video data. Generally, a video encoding apparatus encodes an original picture by dividing it into a plurality of coding blocks. The video encoding apparatus obtains a reference picture by decoding a previously encoded picture, searches the reference picture on a block-by-block basis for a region that is similar to the coding block, and calculates a prediction error image representing the difference between the reference region and the coding block and thereby removes temporal redundancy. The video encoding apparatus achieves a high compression ratio by encoding the prediction error image and the motion vector information indicating the location of the reference region. Generally, the inter-predictive coding provides higher compression efficiency than the intra-predictive coding.

Typical video coding schemes that employ the above described predictive coding methods and that are widely used today include the Moving Picture Experts Group Phase 2 (MPEG-2), MPEG-4, and H.264 MPEG-4 Advanced Video Coding (H.264 MPEG-4 AVC) defined by the International Standardization Organization/International Electrotechnical Commission (ISO/IEC). In these coding schemes, which predictive coding method, the intra-predictive coding or the inter-predictive coding, was selected to encode a picture is explicitly indicated, for example, in a video stream containing the encoded video data. The selected predictive coding method is referred to as the coding mode. When the selected coding mode is the intra-predictive coding mode, the video encoding apparatus can select only the intra-predictive coding method as the prediction method to be actually used. On the other hand, when the selected coding mode is the inter-predictive coding mode, the video encoding apparatus can select the inter-predictive coding method as the prediction method to be actually used. Further, when the inter-predictive coding method is selected, the video encoding apparatus can select any one vector mode from among a plurality of vector modes that differ in the method of encoding motion vectors.

In the above video coding schemes, an I picture, P picture, and B picture are defined. The I picture is a picture that is encoded using only information within the picture. The P picture is a picture that is inter-encoded using information of one of previously encoded pictures. The B picture is a picture that is bidirectionally predictive encoded using information of two of previously encoded pictures. The time directions pointing to the two reference pictures to which the B picture refers are designated L0 and L1, respectively. One of the two reference pictures to which the B picture refers may be a picture that is earlier in time than the B picture, and the other may be a picture that is later in time than the B picture. In this case, the direction L0 is a direction that points forward in time from the picture to be encoded, i.e., the B picture, and the direction L1 is a direction that points backward in time from the picture to be encoded. Alternatively, the two reference pictures may be pictures both of which are earlier in time than the B picture. In this case, the directions L0 and L1 are directions that both point forward in time from the picture to be encoded. Further, the two reference pictures may be pictures both of which are later in time than the B picture. In this case, the directions L0 and L1 are directions that both point backward in time from the picture to be encoded.

In the most recently developed High Efficiency Video Coding (HEVC), the method of dividing a picture into blocks differs from the existing coding schemes. FIG. 1 is a diagram illustrating one example of how a picture is divided according to HEVC.

As illustrated in FIG. 1, the picture 100 is divided into coding blocks referred to as Coding Tree Units (CTUs), and the CTUs 101 are encoded in raster scan order. The size of each CTU 101 is selectable from among sizes of 64×64 to 16×16 pixels. However, the size of each CTU 101 is the same within the same sequence unit.

Each CTU 101 is further divided into a plurality of Coding Units (CUs) 102 using a quadtree structure. The CUs 102 in each CTU 101 are encoded in Z scan order. The size of each CU 102 is variable and is selected from among CU partitioning modes of 8×8 to 64×64 pixels. The CU 102 is the unit at which a decision is made as to whether to select the intra-predictive coding mode or the inter-predictive coding mode as the coding mode. Each CU 102 is partitioned into Prediction Units (PUs) 103 or Transform Units (TUs) 104 for processing. The PU 103 is the unit at which the prediction is performed in accordance with the selected coding mode. For example, in the intra-predictive coding mode, the PU 103 is the unit at which a prediction mode is applied and, in the inter-predictive coding mode, the PU 103 is the unit at which motion compensation is performed. The size of the PU 103 is selectable from among PU partitioning modes PartMode=2N×2N, N×N, 2N×N, N×2N, 2N×U, 2N×nD, nR×2N, and nL×2N. On the other hand, the TU 104 is the orthogonal transform unit, and the size of the TU 104 is selected from among sizes of 4×4 to 32×32 pixels. The TUs 104 are formed by partitioning using a quadtree structure and are processed in Z scan order. For convenience, in the present specification, the prediction unit will be referred to as the first sub-block, and the coding unit as the second sub-block.

Generally, the amount of computation needed for encoding video data increases as the number of pixels contained in a picture increases. In view of this, a study is being conducted on reducing the time needed for encoding by dividing each picture contained in video into a plurality of regions and by encoding each region using a separate encoder.

In one known method of dividing a picture into a plurality of regions, the picture is divided into basic units referred to as slices. In this case, the encoders encode the input slices independently of one another by regarding each slice as one picture, and the encoded data output from the respective encoders are multiplexed together for output. By thus using different encoders for different slices, the encoders can each be constructed using a processing unit having a low processing capability; this may serve, for example, to reduce the production cost of the encoding apparatus as a whole.

In a system that uses a plurality of encoders to encode respectively different regions, encoded data of the entire picture encoded in the past is stored as shared information accessible from the respective encoders. In this case, in order to reduce the hardware resources needed, a study has been conducted on reducing the memory capacity for temporarily storing the shared information by reducing the amount of shared information data (for example, refer to Japanese Laid-open Patent Publication Nos. H07-135654, H10-276437, and 2000-165883).

SUMMARY

In HEVC, the CTUs in each slice are encoded in raster scan order. The plurality of CTUs contained in each slice are treated as one group, and when encoding any CTU contained in a given slice, predicting the CTU from other slices in the same picture is prohibited.

A structure referred to as tiles is introduced along with the slices in HEVC as basic units into which a picture is to be divided. Unlike the slices, the tiles can be set so as to divide the picture vertically as well as horizontally. For examples, the tiles are each set in a rectangular shape.

FIG. 2 is a diagram illustrating one example of how the tiles are set to partition a picture. In the illustrated example, the picture 203 is partitioned in a grid pattern into four rectangular tiles 201 by horizontal and vertical tile boundaries 203. The CTUs 202 are grouped together for each rectangular tile 201. The tiles 201 in the picture 200 are encoded in raster scan order. The CTUs 202 in each tile 201 also are encoded in raster scan order.

When encoding any CTU contained in a given tile, predicting the CTU from other tiles in the same picture across the tile boundaries is prohibited. On the other hand, when encoding any CTU contained in a given tile, the video encoding apparatus is allowed to predict the CTU from other tiles in already encoded other pictures.

Therefore, when encoding a video image by using a different encoder for each tile, the characteristics of the tiles such as described above need to be considered in order to reduce the amount of shared information to be shared among the respective encoders.

According to one embodiment, a video encoding apparatus for encoding a picture contained in video data is provided. The video encoding apparatus includes: a divider which divides the picture into a plurality of regions; a plurality of encoders each of which encodes a corresponding one of the plurality of regions to generate encoded data; and a multiplexer which takes as inputs the encoded data output from the plurality of encoders, and generates encoded data of the picture by arranging the input encoded data in a prescribed order. A first one of the plurality of encoders includes: an inhibited block identifying unit which identifies as a first inhibit target sub-block a first sub-block that is contained in a first region to be encoded by the first encoder, the first region being among the plurality of regions, and that may select a motion vector of a referenced block contained in a second region encoded by a second one of the plurality of encoders, the second region being among the plurality of regions in another picture already encoded, as a prediction vector for the motion vector of the first sub-block when encoding the first sub-block by using an inter-predictive coding mode that refers to the picture already encoded; a predictive encoding unit which generates encoded data by encoding a second inhibit target sub-block either by using the inter-predictive coding mode by selecting as the prediction vector a motion vector other than the motion vector of the referenced block selected for the first inhibit target sub-block or by using an intra-predictive coding mode that refers only to the picture being encoded, wherein the second inhibit target sub-block is a second sub-block containing the first inhibit target sub-block and is selected from among a plurality of second sub-blocks into which the first region is divided and at each of which a decision is made as to whether to apply the inter-predictive coding mode or the intra-predictive coding mode; and an entropy encoding unit which entropy-encodes the encoded data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is an operation flowchart illustrating a procedure for constructing a prediction vector candidate list mergeCandList in a merge mode.

FIGS. 16A to 16H are diagrams illustrating how an index is assigned to each PU contained in one CU.

FIGS. 17A to 17H are examples of maps indicating inter-prediction inhibit target PUs when the PU partitioning mode PartMode is 2N×2N, N×N, 2N×N, N×2N, 2N×U, 2N×nD, nR×2N, and nL×2N, respectively.

FIGS. 18A to 18H are alternative examples of maps indicating inter-prediction inhibit target PUs when the PU partitioning mode PartMode is 2N×2N, N×N, 2N×N, N×2N, 2N×U, 2N×nD, nR×2N, and nL×2N, respectively.

DESCRIPTION OF EMBODIMENTS

A video encoding apparatus according to one embodiment will be described below with reference to the drawings. The video encoding apparatus divides a picture into a plurality of regions, and a plurality of encoders encode the respective regions. This video encoding apparatus reduces the memory capacity needed to store information to be shared among the respective encoders when encoding the respective regions.

More specifically, when predictive-encoding the motion vector for a CTU located in the neighborhood of a region boundary, the video encoding apparatus reduces the amount of the information to be referred to across the boundary defined between the regions to be encoded using different encoders. In the present embodiment, the video encoding apparatus employs HEVC as the video coding scheme. Alternatively, the video encoding apparatus may encode video data in accordance with some other suitable video coding scheme that can individually encodes the video data on a tile-by-tile basis.

First, a motion vector predictive-coding scheme in HEVC will be described. In HEVC, the motion vector can be obtained on a PU-by-PU basis. Further, HEVC defines an adaptive motion vector prediction (AMVP) mode in which an error vector is encoded using a prediction vector to encode the motion vector, and a merge mode in which the motion vector of an already encoded PU is copied as the motion vector of the PU to be encoded. These modes are referred to as the inter-prediction modes. In the inter-prediction modes, the following modes are defined as the vector modes that define the method of prediction vector construction.

Spatial vector mode which uses the motion vectors of blocks spatially neighboring the block to be encoded. Prediction vector candidates selected by the spatial vector mode from among the motion vectors of the blocks spatially neighboring the block to be encoded will hereinafter be referred to as spatial prediction vectors.

Temporal vector mode which uses the motion vectors of blocks located in the neighborhood of the same region as the block to be encoded and contained in an already encoded picture that temporally precedes the current picture containing the block to be encoded. Prediction vector candidates selected by the temporal vector mode from among the motion vectors of the blocks contained in the already encoded picture will hereinafter be referred to as temporal prediction vectors.

Combined bi-directive vector mode which uses a vector constructed from a combination of a spatial vector and a temporal vector.

Zero vector mode which uses a zero vector whose magnitude is zero.

In the AMVP mode, a prediction vector candidate list mvpListLX is constructed which contains a maximum of two vector candidates usable as prediction vectors for each prediction direction.

Figure 3:
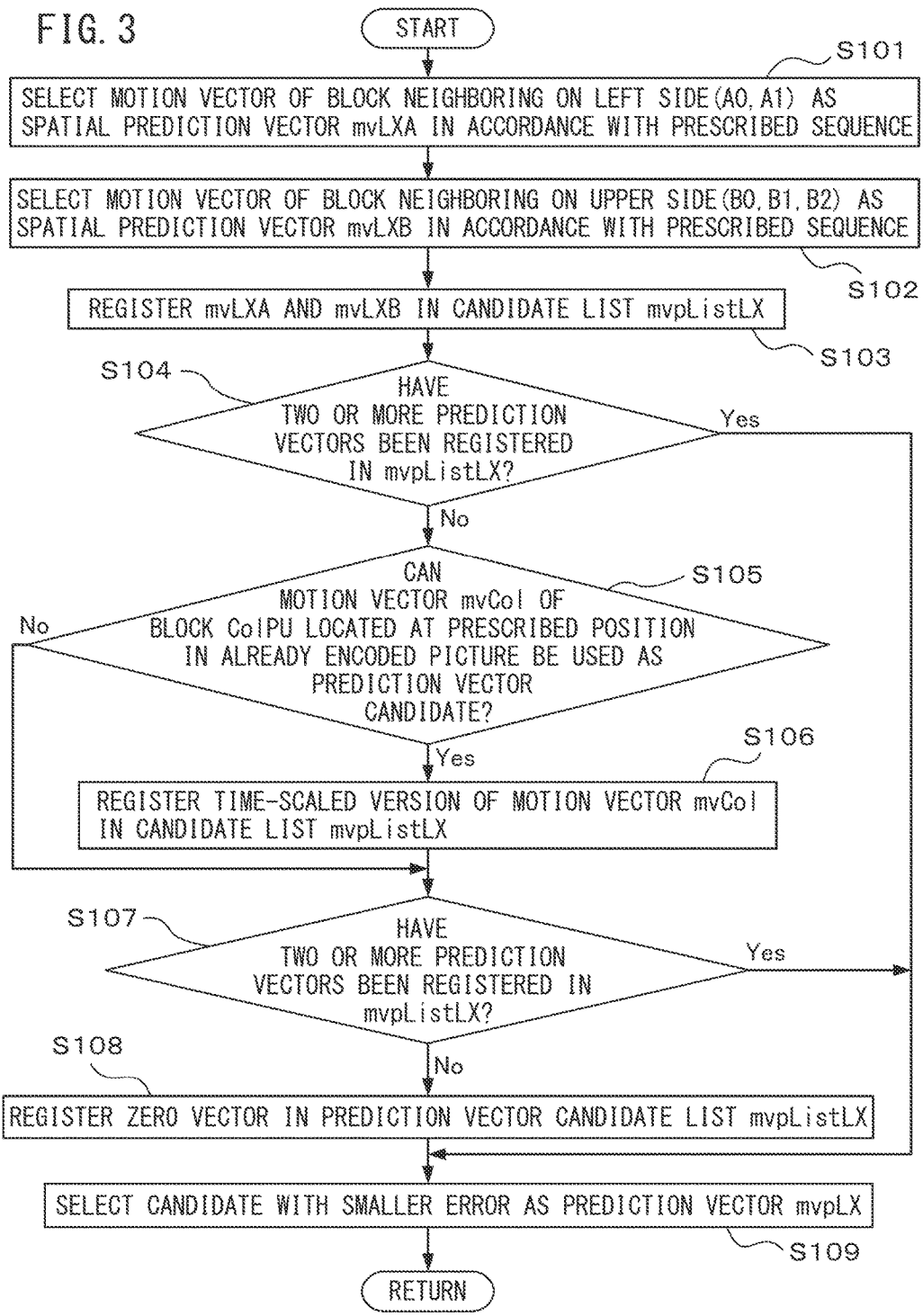
FIG. 3 is an operation flowchart illustrating a prediction vector determining procedure in an AMVP mode.

FIG. 3 is an operation flowchart illustrating a prediction vector determining procedure in the AMVP mode. First, the video encoding apparatus selects prediction vector candidates from the motion vectors of the already encoded blocks neighboring the block to be encoded.

More specifically, the video encoding apparatus selects the motion vector of a block neighboring on the left side of the block to be encoded as a spatial prediction vector mvLXA in accordance with a prescribed sequence (step S101).

Figure 4:
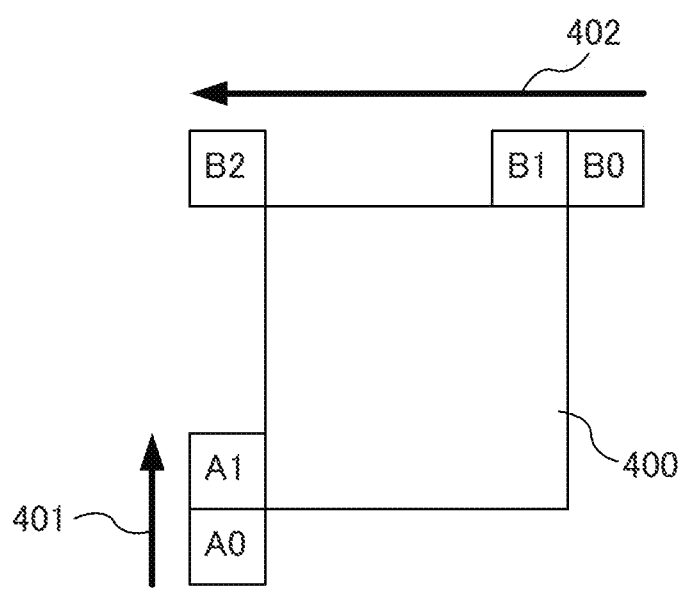
FIG. 4 is a diagram depicting a sequence for registering spatial prediction vectors in the AMVP mode.

The procedure for selecting spatial prediction vectors will be described in detail with reference to FIG. 4. FIG. 4 is a diagram depicting a sequence for registering spatial prediction vectors in the AMVP mode. For the block 400 to be encoded, the video encoding apparatus examines first the block A0 neighboring on the lower left side and then the block A1 neighboring on the upper side of the block A0, as indicated by arrow 401, to determine whether or not the motion vector of the examined block is to be registered as a spatial prediction vector.

The video encoding apparatus identifies whether the block A0 is already encoded or not. When the block A0 is already encoded, the video encoding apparatus then determines whether the block A0 is inter-predictive encoded in the same direction as the block 400 to be encoded. When the block A0 is inter-predictive encoded in the same direction as the block 400 to be encoded, the video encoding apparatus proceeds to determine whether the reference picture refIdxLXA0 for the block A0 matches the reference picture refIdxLX for the block 400 to be encoded. When the reference picture refIdx-LXA0 matches the reference picture refIdxLX, the video encoding apparatus selects the motion vector of the block A0 as the first spatial prediction vector mvLXA.

On the other hand, when the block A0 is not encoded yet, or when the reference picture refIdxLXA0 does not match the reference picture refIdxLX, the video encoding apparatus performs the same processing on the block A1. When the block A1 is already encoded, and when the reference picture refIdxLXA1 to which the block A1 refers matches the reference picture refIdxLX, the video encoding apparatus selects the motion vector of the block A1 as the spatial prediction vector mvLXA.

When neither the reference picture refIdxLXA0 nor the reference picture refIdxLXA1 matches the reference picture refIdxLX, and when the block A0 is inter-predictive encoded in the same direction as the block 400 to be encoded, the video encoding apparatus selects the motion vector of the block A0. Then, the video encoding apparatus multiples the motion vector of the block A0 by the ratio of the time between the current picture containing the block 400 to be encoded and the reference picture refIdxLX to the time between the current picture and the reference picture refIdxLXA0. The video encoding apparatus takes the resulting vector as the spatial prediction vector mvLXA.

When the above process fails to obtain the spatial prediction vector mvLXA, and when the block A0 is inter-predictive encoded in the same direction as the block 400 to be encoded, the video encoding apparatus selects the motion vector of the block A1. Then, the video encoding apparatus multiples the motion vector of the block A1 by the ratio of the time between the current picture and the reference picture refIdxLX to the time between the current picture and the reference picture refIdxLXA1. The video encoding apparatus takes the resulting vector as the spatial prediction vector mvLXA. When neither of the blocks A0 and A1 is inter-predictive encoded in the same direction as the block 400 to be encoded, no spatial prediction vector mvLXA is selected.

Next, the video encoding apparatus selects the motion vector of a block neighboring on the upper side of the block to be encoded as a spatial prediction vector mvLXB in accordance with a prescribed sequence (step S102).

Referring back to FIG. 4, the video encoding apparatus examines the blocks B0, B1, and B2 neighboring on the upper side of the block 400 in the order indicated by arrow 402, in the same manner as described above for the blocks A0 and A1. Then, the video encoding apparatus determines whether the motion vector of the examined block is to be selected as the spatial prediction vector mvLXB. The block B0 is a block neighboring on the upper right side of the block 400 to be encoded, and the block B1 is a block neighboring on the left side of the block B0. The block B2 is a block neighboring on the upper left side of the block 400 to be encoded.

More specifically, the video encoding apparatus examines the block B0 to B2 in sequence, and selects as the spatial prediction vector mvLXB the motion vector of the first block whose reference picture matches the reference picture refIdxLX of the block 400 to be encoded. When none of the reference pictures of the blocks B0 to B2 do not match the reference picture refIdxLX, then the video encoding apparatus examines the block B0 to B2 in sequence, and identifies the first block for which the motion vector was obtained. Then, the motion vector of the identified block is multiplied by the ratio of the time between the current picture and the reference picture refIdxLX to the time between the reference picture to which the identified block refers and the current picture, and the resulting vector is taken as the spatial prediction vector mvLXB.

When none of the blocks B0 to B2 are inter-predictive encoded in the same direction as the block 400 to be encoded, the video encoding apparatus substitutes the spatial prediction vector mvLXA for the spatial prediction vector mvLXB. In this case, when no spatial prediction vector mvLXA is selected, no spatial prediction vector mvLXB will be selected either.

The video encoding apparatus registers the spatial prediction vectors mvLXA and mvLXB in the prediction vector candidate list mvpListLX (step S103). When the spatial prediction vectors mvLXA and mvLXB are the same, the spatial prediction vector mvLXB is deleted from the candidate list mvpListLX.

The video encoding apparatus checks to see when at least two prediction vector candidates are registered in the candidate list mvpListLX (step S104). When at least two prediction vector candidates are registered in the candidate list mvpListLX (Yes in step S104), the video encoding apparatus terminates the prediction vector candidate list construction procedure. On the other hand, when the number of spatial prediction vectors registered in the candidate list mvpListLX is less than 2 (No in step S104), the video encoding apparatus proceeds to perform the temporal vector mode processing. The video encoding apparatus can selectively disable the temporal vector mode processing on a slice-by-slice basis by using a syntax sliceTemporalMvpEnableFlag.

In the temporal vector mode processing, the video encoding apparatus selects a block ColPU located at a prescribed position in an already encoded picture. Then, the video encoding apparatus checks to see when the motion vector mvCol of that block ColPU can be used as a prediction vector candidate (step S105).

The video encoding apparatus selects a candidate picture from among the already encoded pictures to which the block to be encoded may refer. Then, the video encoding apparatus identifies, from within the selected picture ColPic, the block ColPU neighboring the block located at the same position as the block to be encoded.

A syntax collocatedFromL0Flag is used to indicate whether the picture ColPic containing the block ColPU is selected from the direction L0 or from the direction L1. A syntax collocatedRefIdx is used to indicate the picture selected as the ColPic.

Figure 5A:
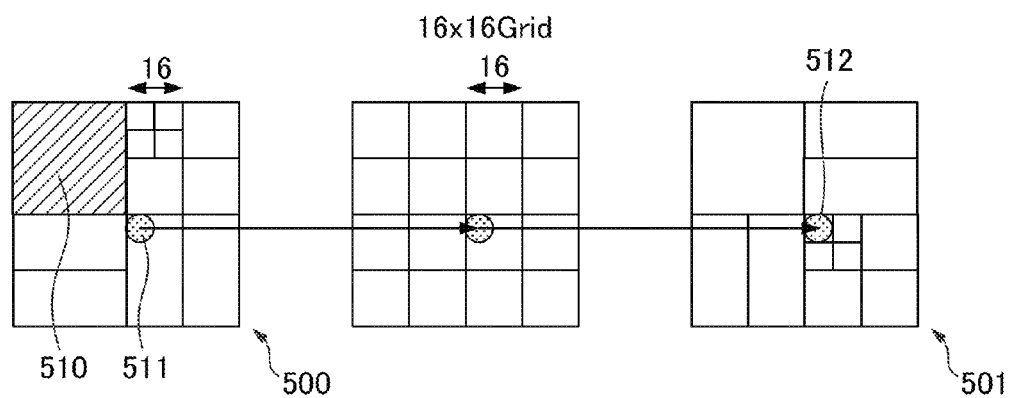
FIGS. 5A to 5C are diagrams each illustrating one example of the positional relationship between a block to be encoded and a block ColPU.
Figure 5B:
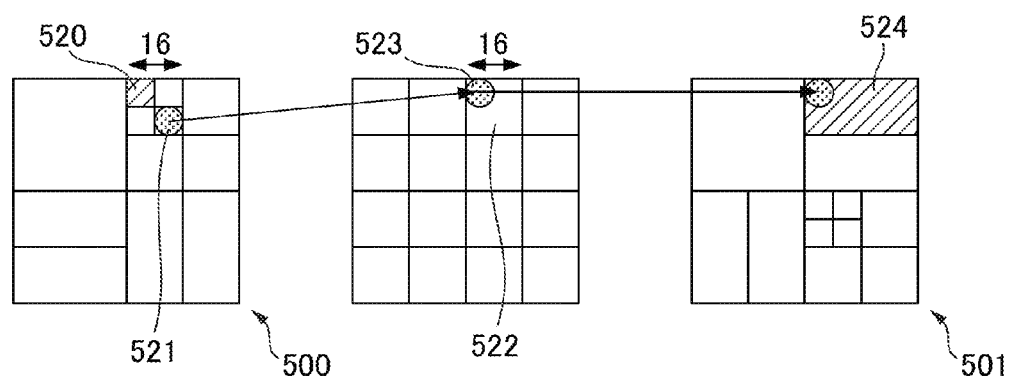
Figure 5C:
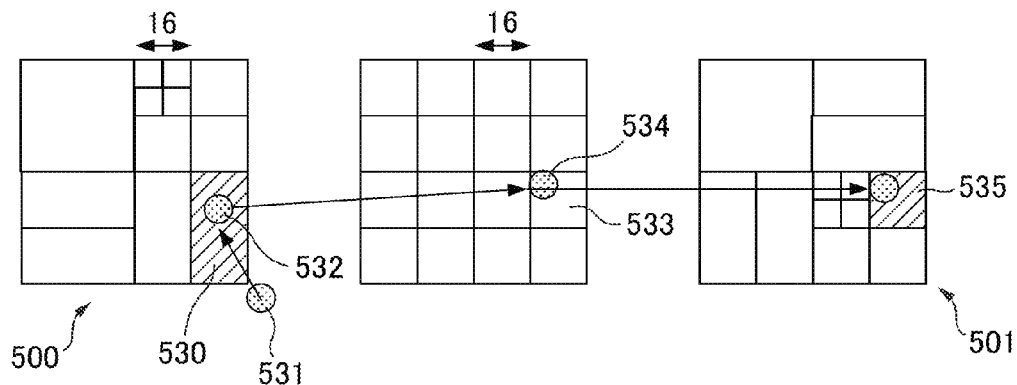

The positional relationship between the block to be encoded and the block ColPU will be described with reference to FIGS. 5A to 5C. FIGS. 5A to 5C each depict one CTU 500 within a picture. Basically, a PU neighboring on the lower right side of the PU to be encoded, i.e., the block to be encoded, is selected as the ColPU. For example, when there is no CTU boundary between the block to be encoded and the PU neighboring on the lower right side, a PU containing the pixel at the upper left edge of a grid of 16×16 pixels including the pixel neighboring on the lower right side of the block to be encoded is selected as the ColPU.

For example, when the PU 510 as the block to be encoded is a block larger than a 16×16 pixel block located in the upper left corner of the CTU 500, as depicted in FIG. 5A, the pixel 511 neighboring on the lower right side of the PU 510 is located at the same corresponding position in the 16×16 pixel grid unit. Therefore, in the picture ColPic 501, the PU 512 neighboring on the lower right side of the PU 510 is selected as the ColPU. On the other hand, when the PU 520 as the block to be encoded is a block occupying the upper left quarter of a 16×16 pixel block, as depicted in FIG. 5B, the pixel 521 neighboring on the lower right side thereof is located near the center of the 16×16 pixel grid 522. Therefore, in the picture ColPic 501, a PU 524 containing the pixel 523 at the upper left edge of the grid 522 is selected as the ColPU.

When there is a CTU boundary between the block to be encoded and the PU neighboring on the lower right side, then the position of the pixel located to the upper left of the center of the block to be encoded is obtained, and a 16×16 pixel grid containing that pixel is identified. Then, a PU that is contained in the ColPic, and that contains the pixel at the upper left edge of the identified grid, is selected as the ColPU.

For example, when the PU 530 as the block to be encoded is located at the lower right of the CTU 500, as depicted in FIG. 5C, there is a CTU boundary between the PU 530 and the pixel 531 located to the lower right thereof. In this case, the pixel 532 located at the center of the PU 530 is obtained, and a 16×16 pixel grid 533 containing that pixel 532 is identified. Then, in the picture ColPic 501, a PU 535 containing the pixel 534 at the upper left edge of the grid 533 is selected as the ColPU.

When the ColPU is an intra-predictive encoded block, there is no motion vector associated with the ColPU; therefore, the video encoding apparatus is unable to use the motion vector of the ColPU as the prediction vector. When there is no motion vector in the direction L0 for the ColPU, the video encoding apparatus uses the motion vector defined in the direction L1. Conversely, when there is no motion vector in the direction L1 for the ColPU, the video encoding apparatus uses the motion vector defined in the direction L0. When there are motion vectors in both directions L0 and L1 for the ColPU, and when the pictures to which the block to be encoded refers are all past pictures or the picture to which the block to be encoded belongs, then the video encoding apparatus uses the motion vector defined in the direction specified by the syntax collocatedFromL0Flag. On the other hand, when there are motion vectors in both directions L0 and L1 for the ColPU, and when the pictures to which the block to be encoded refers includes a future picture, then the video encoding apparatus uses the motion vector defined in the direction opposite to the direction specified by the syntax collocatedFromL0Flag.

When the motion vector mvCol can be used (Yes in step S105), the video encoding apparatus registers the time-scaled version of the motion vector mvCol as the temporal prediction vector mvLXB in the candidate list mvpListLX (step S106). More specifically, the video encoding apparatus multiplies the motion vector mvCol by the ratio of the time between the current picture containing the block to be encoded and the picture to which the block to be encoded refers to the time between the picture containing the Col block and the picture to which the Col block refers. When the temporal prediction vector mvLXB is equal to one or the other of the two vectors mvLXA registered in the candidate list mvpListLX, the video encoding apparatus deletes the temporal prediction vector mvLXB from the candidate list mvpListLX.

After step S106, or when it is determined in step S105 that the motion vector mvCol is not usable (No in step S105), it is determined whether at least two prediction vector candidates are registered in the candidate list mvpListLX (step S107). When the number of prediction vector candidates registered in the candidate list mvpListLX is less than 2 (No in step S107), the video encoding apparatus registers a zero vector as a prediction vector candidate in the candidate list mvpListLX (step S108). The zero vector is a vector in which the value of the element indicating the amount of motion in the horizontal direction and the value of the element indicating the amount of motion in the vertical direction are both zero.

After step S108, the video encoding apparatus selects as the prediction vector mvpLX the candidate whose error relative to the motion vector of the block to be encoded is the smaller of the two candidates (step S109). When it is determined in step S107 that at least two prediction vector candidates are registered in the candidate list mvpListLX (Yes in step S107), the video encoding apparatus proceeds to carry out the step S109. Then, the video encoding apparatus terminates the prediction vector determining procedure.

The vector selected as the prediction vector mvpLX is expressed by a syntax mvpLXFlag which indicates the position of the selected vector in the candidate list mvpListLX. The syntax mvpLXFlag and the error vector representing the difference between the prediction vector and the motion vector of the block to be encoded are entropy-encoded.

When the current picture is a P picture, the video encoding apparatus carries out the above process only for the motion vector in the direction L0. On the other hand, when the current picture is a B picture, the video encoding apparatus carries out the above process for the motion vectors in both the direction L0 and the direction L1.

Next, the merge mode will be described.

FIG. 6 is an operation flowchart illustrating a procedure for constructing a prediction vector candidate list merge-CandList in the merge mode. In the merge mode, the video encoding apparatus selects one vector as a merge vector mvLXN from usable merge vector candidates the number of which (five at maximum) is specified by a syntax MaxNum-MergeCand, and expresses the selected vector by a syntax mergeIdx which indicates the position in the candidate list mergeCandList.

The video encoding apparatus selects the motion vector of a block neighboring on the left side or upper side of the block to be encoded as a spatial prediction vector candidate in accordance with a prescribed sequence (step S201).

Figures 7, 8:
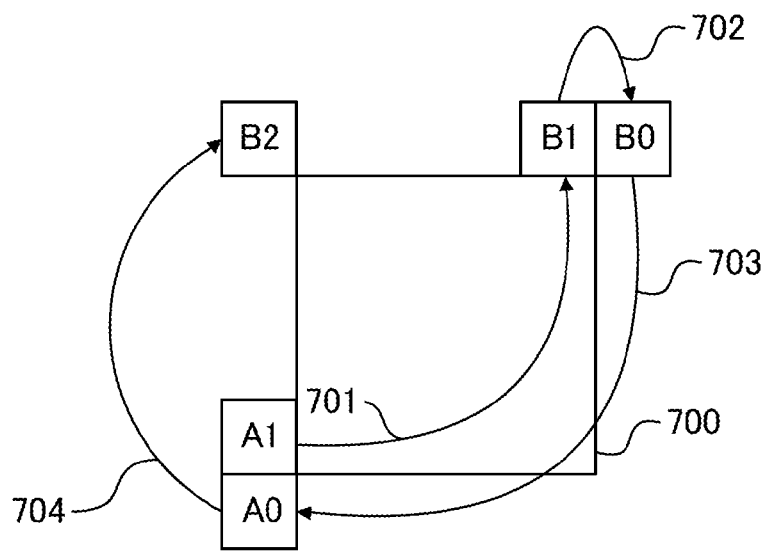
FIG. 7 is a diagram depicting a sequence for registering spatial prediction vectors in the merge mode.
FIG. 8 is a diagram illustrating a table that provides a mapping of prediction vector candidates in directions L0 and L1 to combined bi-predictive vector candidates mvLXcombCand.

The procedure for selecting spatial prediction vectors will be described in detail with reference to FIG. 7. FIG. 7 is a diagram illustrating a sequence for registering spatial prediction vectors in the merge mode. For the PU 700 which is the block to be encoded, the video encoding apparatus examines the blocks A1, B1, B0, A0, and B2 in sequence, as indicated by arrows 701 to 704, to determine whether or not the motion vector of the examined block is to be registered as a spatial prediction vector candidate.

When there are a plurality of spatial prediction vector candidates having the same value, all of such spatial prediction vector candidates except one are deleted. For example, when a certain block is partitioned, and when the block uses the vector of another block as a candidate, then it is deleted because there is no need for portioning. In the case of the block B2, when already four spatial prediction vector candidates have been selected, the motion vector of the block B2 is excluded from the spatial prediction vector candidates. The spatial prediction vector candidates for the respective blocks are designated mvLXA0, mvLXA1, mvLXB0, mvLXB1, and mvLXB2, respectively.

Next, the video encoding apparatus performs the temporal vector mode processing to select a temporal prediction vector candidate mvLXCol (step S202). The temporal vector mode processing in the merge mode is the same as the temporal vector mode processing in the AMVP mode, and therefore, the temporal vector mode processing will not be further described herein.

The video encoding apparatus registers the selected prediction vector candidates in the candidate list mergeCandList (step S203). Then, the video encoding apparatus counts the number, numOrigMergeCand, of prediction vector candidates registered in the candidate list mergeCandList (step S204).

Next, the video encoding apparatus determines whether the condition that the current picture containing the block to be encoded is a B picture and the condition that numOrigMergeCand is not smaller than 2 but smaller than MaxNumMergeCand are both satisfied (step S205). When the conditions are both satisfied in step S205, the video encoding apparatus derives a combined bi-predictive vector by combining prediction vector candidates registered in the candidate list mergeCandList, and adds it as a prediction vector candidate (step S206). The video encoding apparatus repeats the processing of step S206 a predetermined number of times given by numOrigMergeCand×(numOrigMergeCand−1) or until the number of prediction vector candidates reaches MaxNumMergeCand. The computed vector candidate is designated mvLXcombCand.

FIG. 8 illustrates a table that provides a mapping of the prediction vector candidates in the directions L0 and L1 to the combined bi-predictive vector candidates mvLXcombCand when MaxNumMergeCand is 4. In the table 800, 10CanIdx indicates the order in which the prediction vector candidates in the direction L0 are registered in the candidate list mergeCandList, and 11CanIdx indicates the order in which the prediction vector candidates in the direction L1 are registered in the candidate list mergeCandList. On the other hand, comIdx indicates mvLXcombCand derived from a combination of the prediction vector candidate in the direction L0 and the prediction vector candidate in the direction L1.

After step S206, or when the conditions are not satisfied in step S205, the video encoding apparatus proceeds to determine whether the number of prediction vector candidates is smaller than MaxNumMergeCand or not (step S207). When the number, numOrigMergeCand, of prediction vector candidates is smaller than MaxNumMergeCand (Yes in step S207), the video encoding apparatus registers zero vectors as prediction vector candidates in the candidate list mergeCandList until the number of prediction vector candidates reaches MaxNumMergeCand (step S208).

After step S208, the video encoding apparatus selects as the merge vector mvLXN the candidate whose error relative to the motion vector of the block to be encoded is the smallest among the prediction vector candidates (step S209). When it is determined in step S207 that the number, numOrigMergeCand, of prediction vector candidates is not smaller than MaxNumMergeCand (No in step S207), the video encoding apparatus proceeds to carry out the step S209. After that, the video encoding apparatus terminates the candidate list mergeCandList construction procedure.

Next, consider the case where the AMVP mode or the merge mode is applied when encoding a picture using different encoders for different tiles.

Figure 9:
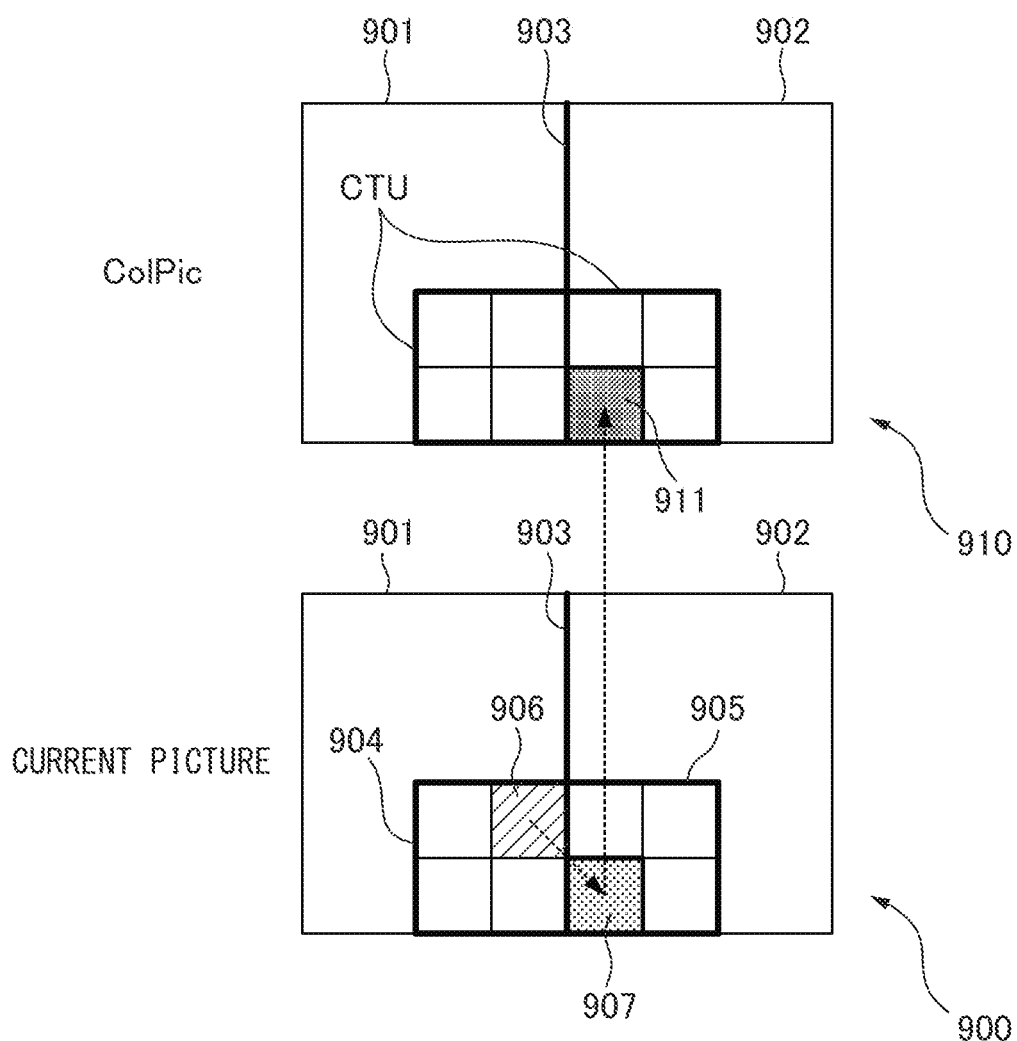
FIG. 9 is a diagram illustrating the relationship between a tile and a temporal prediction vector.

FIG. 9 is a diagram illustrating the relationship between the tile and the temporal prediction vector. In FIG. 9, it is assumed for simplicity that the picture 900 is partitioned into the left-side tile 901 and right-side tile 902. The CTU 904 contained in the tile 901 and the CTU 905 contained in the tile 902 are each 64×64 pixels in size, and are adjacent to each other across a tile boundary 903. The CTUs 904 and 905 are each divided into CUs or TUs for each of which a motion vector is generated.

To obtain a temporal prediction vector for the PU 906 located in the upper right section of the CTU 904, the video encoding apparatus refers to the motion vector of the ColPU 911 located at the same position in the already encoded picture ColPic 910 as the PU 907 located to the lower right of the PU 906. The ColPU 911 belongs to the tile 902 that is located across the tile boundary 903 from the PU 906. When encoding the tiles 901 and 902 by using separate encoders, the data needed for the computation of the temporal prediction vector for the PU 906 needs to be shared between the encoder responsible for encoding the tile 902 and the encoder responsible for encoding the tile 901.

In the case of a CTU located in the neighborhood of a tile boundary, as described above, information pertaining to a region encoded by another encoder is needed to compute the temporal prediction vector for the motion vector of a PU contained in the CTU. Therefore, when determining the temporal prediction vector, the video encoding apparatus identifies a block that needs information within the neighboring tile in order to reduce the memory capacity needed to store information to be shared between the encoders while maintaining picture quality as high as possible. Then, the video encoding apparatus prohibits the application of the temporal vector mode to the block that needs information within the neighboring tile. However, in this case, the application of the temporal vector mode is prohibited in such a manner that the video data encoded by the video encoding apparatus can be decoded by an HEVC-compliant video decoding apparatus.

Figure 10:
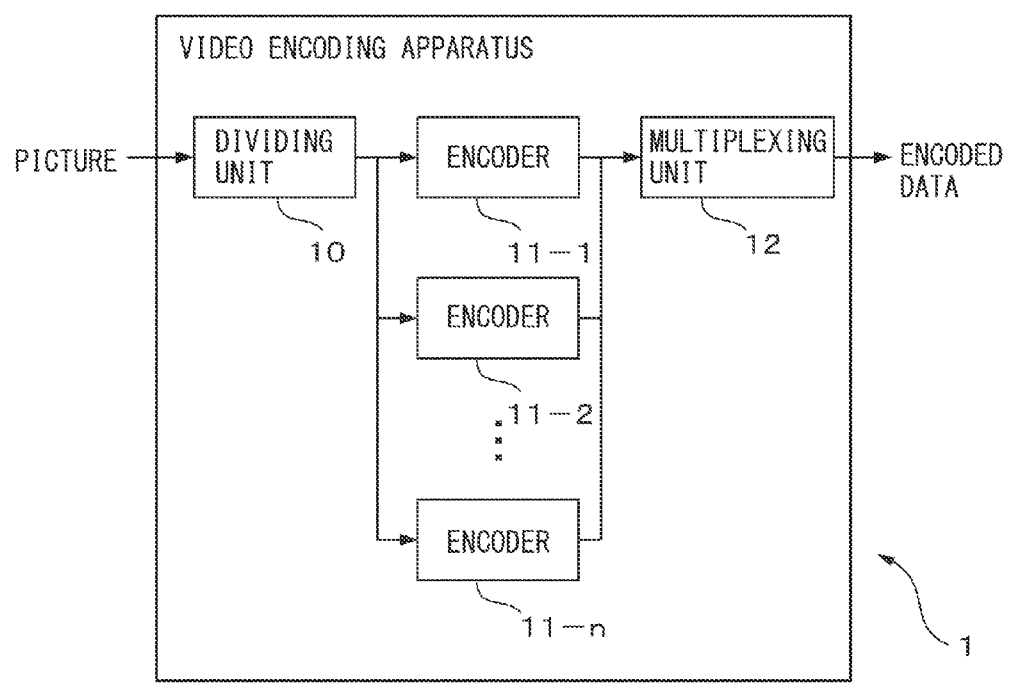
FIG. 10 is a diagram schematically illustrating the configuration of a video encoding apparatus according to a first embodiment.

FIG. 10 is a diagram schematically illustrating the configuration of a video encoding apparatus according to a first embodiment. The video encoding apparatus 1 includes a dividing unit (divider) 10, a plurality of encoders 11-1 to 11-$n$ ($n$ is an integer not smaller than 2), and a multiplexing unit (multiplexer) 12.

These units constituting the video encoding apparatus 1 are constructed as separate circuits. Alternatively, these units constituting the video encoding apparatus 1 may be implemented on the video encoding apparatus 1 in the form of a single integrated circuit on which the circuits corresponding to the respective units are integrated. Further alternatively, these units constituting the video encoding apparatus 1 may be implemented as functional modules by a computer program which is executed on a processor or a plurality of processors incorporated in the video encoding apparatus 1.

Pictures are sequentially input to the dividing unit 10 in accordance with a picture sequence specified by a control unit (not depicted) that controls the entire operation of the video encoding apparatus 1. Each time a picture is input, the dividing unit 10 divides the picture into a number, n, of regions in accordance with picture dividing information supplied from the control unit. In the present embodiment, each region contains one tile. The dividing unit 10 divides each picture in such a manner that a boundary between each region defines a tile boundary. The positions of the tile boundaries are the same throughout the sequence. Each region of the picture divided by the dividing unit 10 is input to a corresponding one of the encoders 11-1 to 11-$n$.

Figure 11:
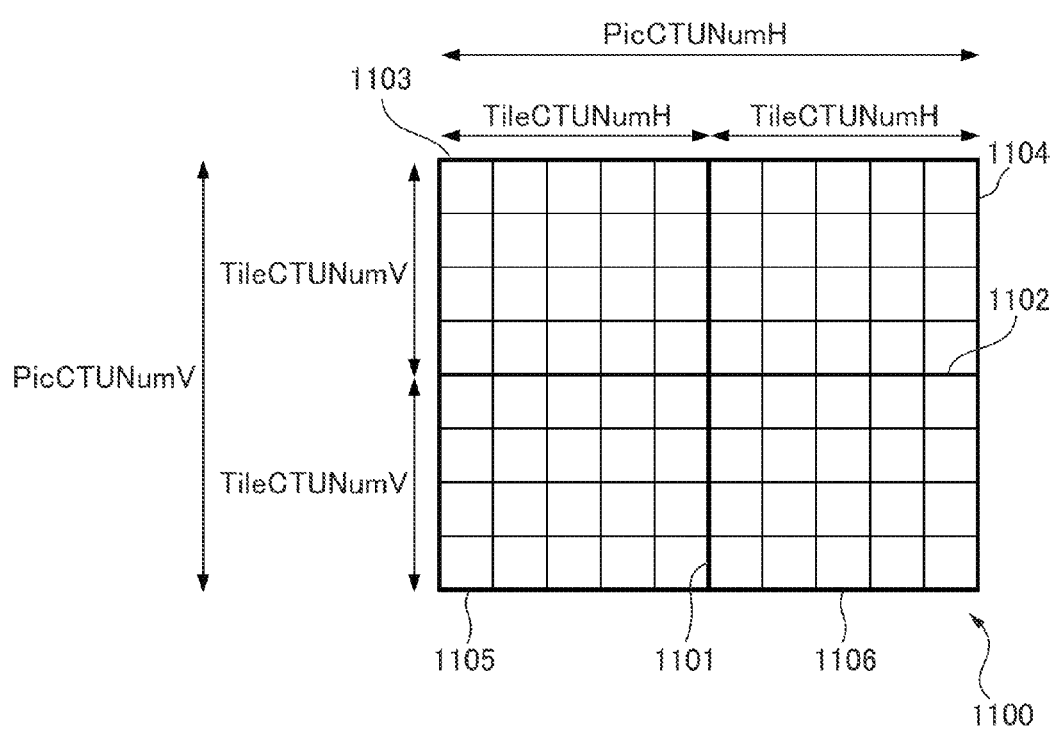
FIG. 11 is a diagram for explaining the positions of tile boundaries.

The positions of the tile boundaries will be explained with reference to FIG. 11. In the picture 1100, the horizontal and vertical size of each individual CTU is designated CTUSIZE (for example, 64 pixels). Further, the number of pixels in the vertical direction of the picture 1100 is designated PictureSizeV, and the number of pixels in the horizontal direction is designated PictureSizeH. The picture dividing information includes, for example, the number of divisions in the vertical direction, DivNumV, and the number of divisions in the horizontal direction, DivNumH. In the illustrated example, DivNumV=DivNumH=2. In other words, the picture 1100 is divided into two regions horizontally and two regions vertically.

Further, the number of CTUs in the vertical direction of the picture 1100 is designated CTUNumV (=PictureSizeV/CTUSIZE), and the number of CTUs in the horizontal direction is designated CTUNumH (=PictureSizeH/CTUSIZE). In this case, when the picture is divided vertically into regions of equal size, the number of CTUs in the vertical direction, TileCTUNumV, in each region is given as PicCTUNumV/DivNumV. When PicCTUNumV is not an integral multiple of DivNumV, the lowermost tile may contain extra CTUs the number of which is smaller than TileCTUNumV. Likewise, when the picture is divided horizontally into regions of equal size, the number of CTUs in the vertical direction, TileCTUNumH, in each region is given as PicCTUNumH/DivNumH. When PicCTUNumH is not an integral multiple of DivNumH, the rightmost tile may contain extra CTUs the number of which is smaller than TileCTUNumH. For simplicity, it is assumed here that PicCTUNumV is an integral multiple of DivNumV and PicCTUNumH is an integral multiple of DivNumH.

In the illustrated example, the picture 1100 is partitioned into four tiles 1103 to 1106 by the vertical tile boundary 1101 and the horizontal tile boundary 1102. Then, for example, the upper left tile 1103 is input to the encoder 11-1, and the upper right tile 1104 is input to the encoder 11-2. Further, the lower left tile 1105 is input to the encoder 11-3, and the lower right tile 1106 is input to the encoder 11-4.

The encoders 11-1 to 11-$n$ generate encoded data by encoding the input regions independently of one another. The encoders 11-1 to 11-$n$ supply the encoded data to the multiplexing unit 12. The details of the encoders 11-1 to 11-$n$ will be described later.

The multiplexing unit 12, which received the encoded data of the respective regions from the encoders 11-1 to 11-$n$, arranges the encoded data in raster scan order, and generates encoded data for one picture by appending prescribed header information conforming to HEVC. Then, the multiplexing unit 12 outputs the encoded data of each picture in accordance with a prescribed picture sequence.

The details of the encoders 11-1 to 11-$n$ will be described below. Since the encoders 11-1 to 11-$n$ are identical in configuration and function, the following description deals only with the encoder 11-1.

The encoder 11-1 encodes the plurality of CTUs contained in the input region on a CTU-by-CTU basis in raster scan order.

Figure 12:
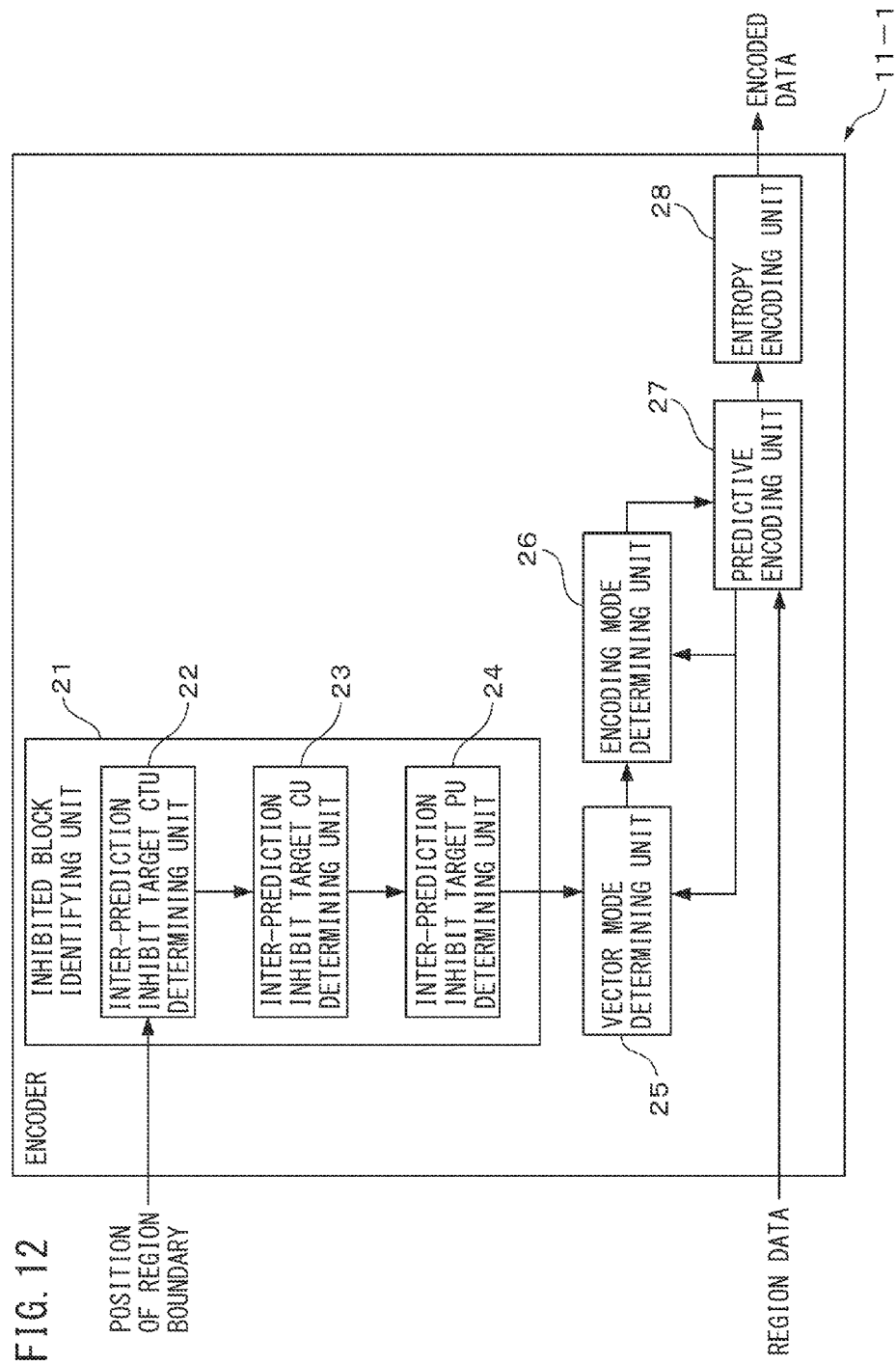
FIG. 12 is a diagram schematically illustrating the configuration of an encoder.

FIG. 12 is a diagram schematically illustrating the configuration of the encoder 11-1. The encoder 11-1 includes an inhibited block identifying unit 21, a vector mode determining unit 25, an encoding mode determining unit 26, a predictive encoding unit 27, and an entropy encoding unit 28.

The inhibited block identifying unit 21 identifies a PU that may select, as the temporal prediction vector for the motion vector to be used when inter-predictive encoding the PU, the motion vector of a PU contained in a region encoded by another encoder in an already encoded picture. For this purpose, the inhibited block identifying unit 21 includes an inter-prediction inhibit target CTU determining unit 22, an inter-prediction inhibit target CU determining unit 23, and an inter-prediction inhibit target PU determining unit 24.

Based on the position of the boundary between two regions that are input to respectively different encoders (i.e., the position of the tile boundary), the inter-prediction inhibit target CTU determining unit 22 determines a CTU containing a PU for which the application of the temporal vector mode is prohibited. The CTU containing a PU for which the application of the temporal vector mode is prohibited will hereinafter be referred to as the inter-prediction inhibit target block.

Referring back to FIG. 11, the tile 1103, for example, is bounded by tile boundaries at the bottom and right side of the tile 1103. On the other hand, the tile 1104 is bounded by tile boundaries at the bottom and left side of the tile 1104. Likewise, the tile 1105 is bounded by tile boundaries at the top and right side of the tile 1105. The tile 1106 is bounded by tile boundaries at the top and left side of the tile 1106.

A characteristic of the temporal vector mode is that, in the already encoded picture to be referred to in the inter-predictive coding mode, the PU neighboring on the lower right side of the current PU is referred to. A further characteristic is that the PU located across the horizontal CTU boundary from the current PU is not referred to. Accordingly, of the tiles to be encoded by the respective encoders, only the tiles that are bounded on their right side by a tile boundary contain inter-prediction inhibit target blocks. In the illustrated example, the tiles 1103 and 1105 contain inter-prediction inhibit target blocks. The following description is given by taking the tile 1103 as an example.

Figure 13:
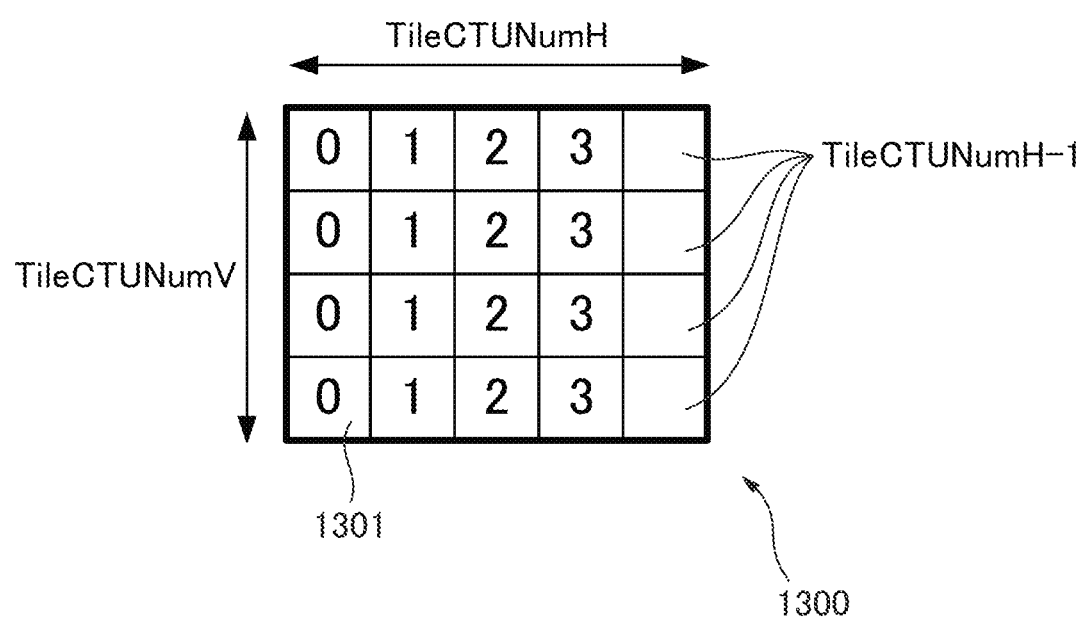
FIG. 13 is a diagram illustrating how a horizontal index is assigned to each CTU.
Figure 14A:
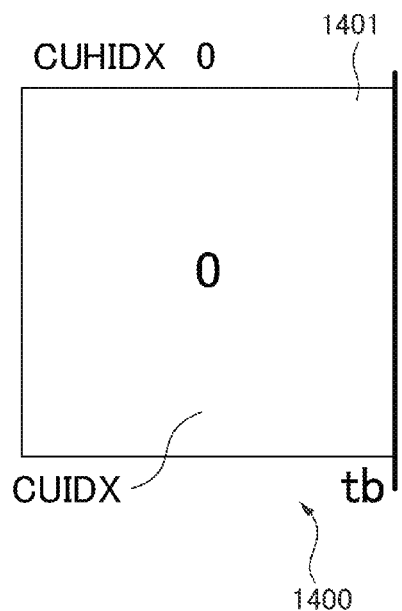
FIG. 14A to 14D are diagrams each illustrating how an index is assigned to each CU contained in one CTU for each CU hierarchical structure.
Figure 14B:
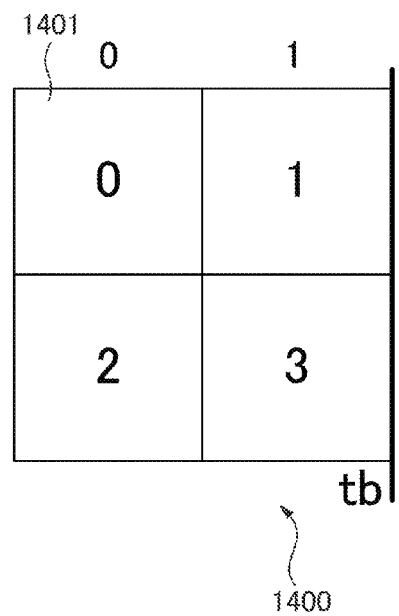
Figure 14C:
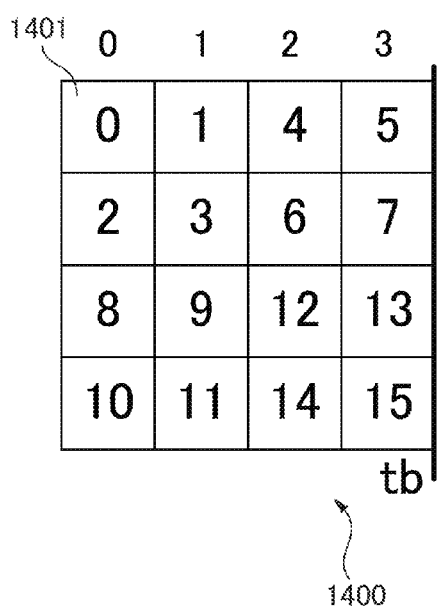
Figure 14D:
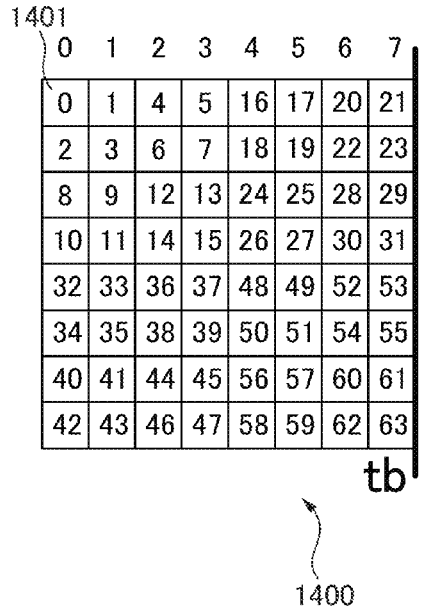

To facilitate an understanding how the inter-prediction inhibit target block is identified, an index assigned to each CTU to identify the CTU will be described below with reference to FIG. 13. In FIG. 13, the tile 1300 is divided into a plurality of CTUs 1301. It is assumed that the CTU size CTUSIZE is 64 pixels. As earlier described, the plurality of CTUs contained in a picture are encoded in raster scan order. Therefore, the indexes CTUIDX for identifying the respective CTUs are set in the encoding order. Further, a horizontal index CTUHIDX to each CTU is assigned in sequence starting with the leftmost CTU. In other words, the CTUHIDX of the leftmost CTU is 0, and the CTUHIDX of the (N+1)th CTU from the leftmost CTU is N. The CTUHIDX of the rightmost CTU is (TileCTUNumH−1).

From the definition of the behavior of the temporal vector mode, the CTU that may be referred to across the tile boundary as described above is the CTU whose right side contacts the vertical tile boundary. Therefore, the inter-prediction inhibit target CTU determining unit 22 identifies the CTU whose horizontal index CTUHIDX is (TileCTUNumH−1) and determines it as being the inter-prediction inhibit target block.

The inter-prediction inhibit target CU determining unit 23 identifies from within the inter-prediction inhibit target block any PU that, from the definition of the behavior of the temporal vector mode, can refer to a motion vector contained in a tile that is not located at the same position in the already encoded picture as the tile to be encoded. The PU that can refer to the motion vector contained in the tile that is not located at the same position as the tile to be encoded is the PU that can refer to the region encoded by another encoder. Then, the inter-prediction inhibit target CU determining unit 23 prohibits the application of the temporal vector mode to the CU containing the identified PU. For convenience of explanation, the CU containing the PU for which the application of the temporal vector mode is prohibited will hereinafter be referred to as the inter-prediction inhibit target CU.

Figure 1:
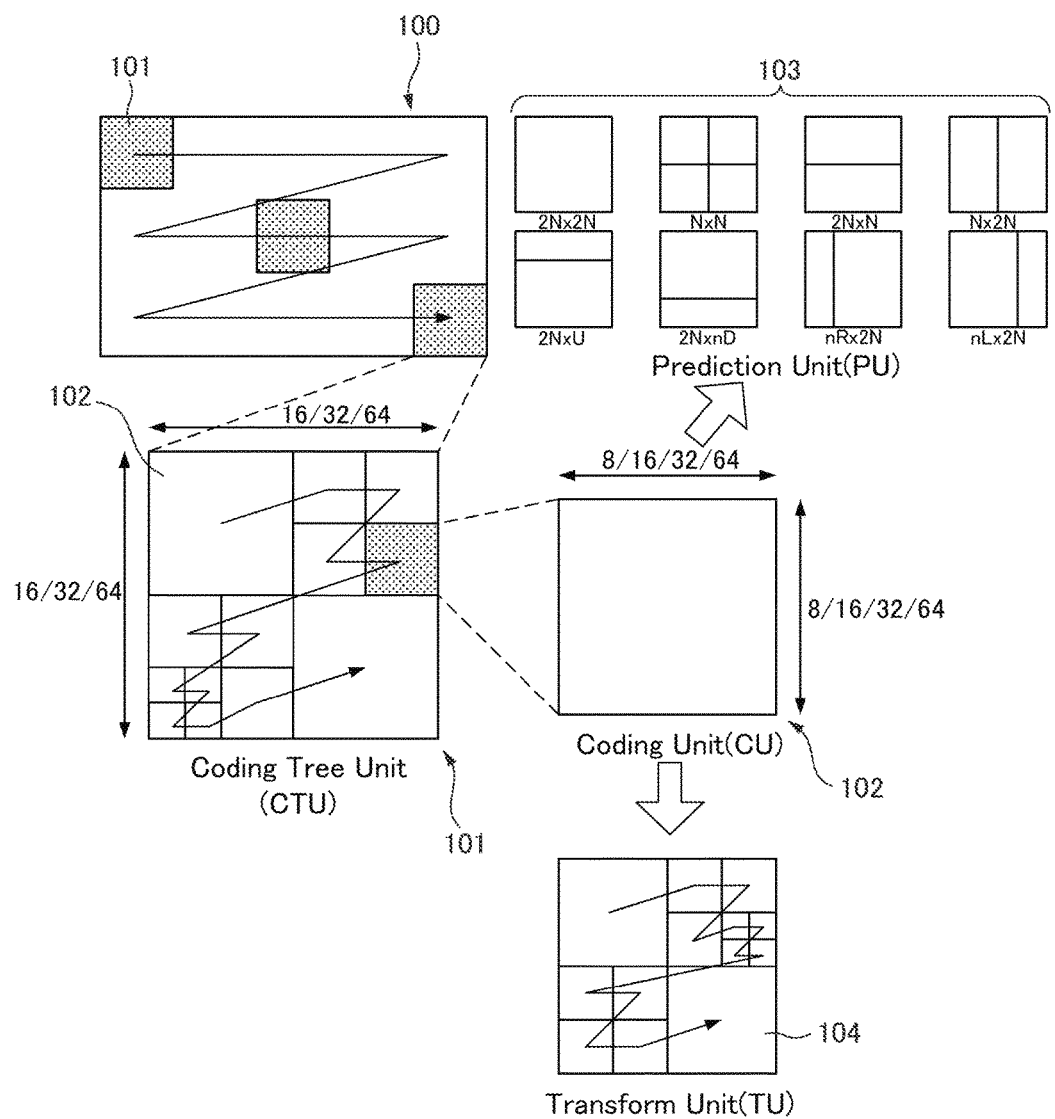
FIG. 1 is a diagram illustrating one example of how a picture is divided according to HEVC.
Figure 2:
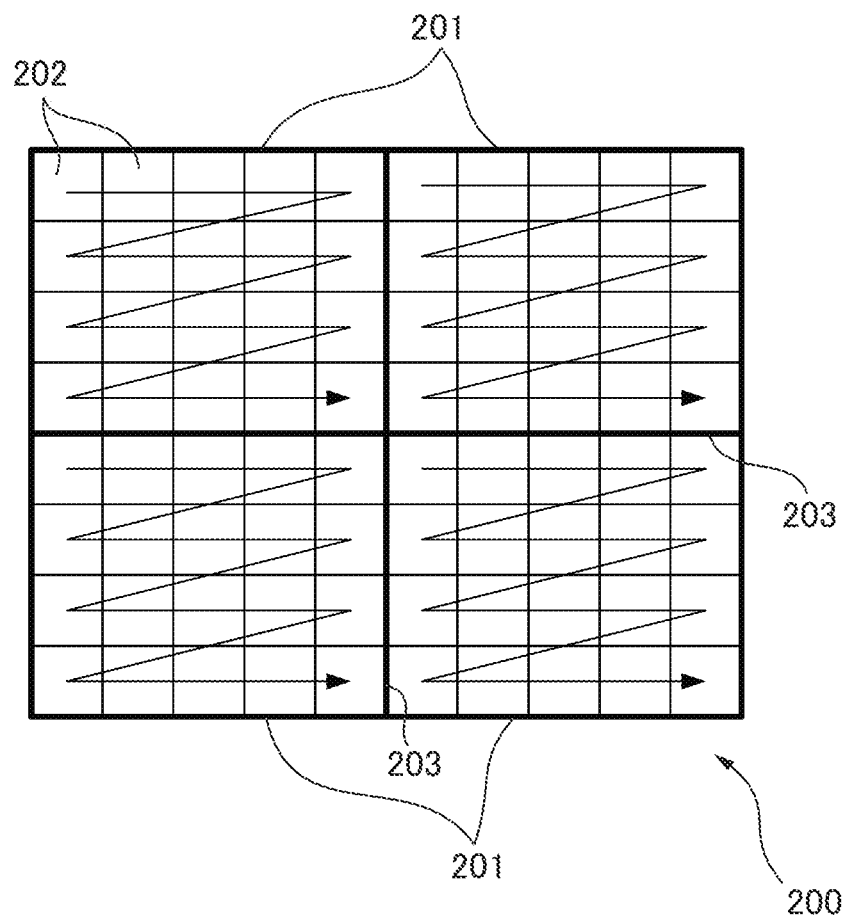
FIG. 2 is a diagram illustrating one example of how tiles are set to partition a picture.

As illustrated in FIG. 1, in HEVC, the selectable CU size is 64×64 pixels at the maximum, and 32×32 pixels, 16×16 pixels, and 8×8 pixels in a quadtree structure. This represents the hierarchical CU structure, and the inter-prediction inhibit target CU is determined for each hierarchical CU structure in order for the encoding mode determining unit 26 to determine the CU size.

A CU identifying index CUIDX assigned to each CU contained in one CTU 1400 for each hierarchical CU structure will be described below with reference to FIGS. 14A to 14D. In FIGS. 14A to 14D, each block 1401 represents one CU, and the numeric value within each block indicates the CU index CUIDX. Each numeric value above the CTU 1400 indicates the horizontal CU index CUHIDX. FIG. 14 indicates the CU index CUIDX when the CU size is 64×64 pixels. Likewise, FIGS. 14B to 14D indicate CU indexes CUIDX when the CU size is 32×32 pixels, 16×16 pixels, and 8×8 pixels, respectively.

The CU index CUIDX is assigned in encoding order, for example, in raster scan order. In the present embodiment, the horizontal CU index CUHIDX to each CU in the horizontal direction is assigned in sequence from left to right in the horizontal direction.

For convenience, a coordinate system is defined for the CTU identified as the inter-prediction inhibit target block by taking the left edge of the CTU as the reference position. In this coordinate system, when the tile boundary coordinate (pixel resolution) located at the right edge of the tile is denoted as tb, tb is given as tb=(TileCTUNumH*CTUSIZE−1). It is assumed that the pixel coordinate at the left edge of the tile is 0.

The inter-prediction inhibit target CU determining unit 23 identifies the CU contacting the tile boundary at the left edge of the tile and having CUHIDX=tb/CUSIZE, and determines it as being the inter-prediction inhibit target CU. However, in the case of the CU corresponding to the PU to be encoded for which there is a CTU boundary between the PU to be encoded and the PU located to the lower right thereof, as depicted in FIG. 5C, i.e., in the case of the CU whose CUIDX is {(CTUSIZE/CUSIZE)*(CTUSIZE/CUSIZE)−1)}, the position of the ColPU is corrected. Therefore, as an exception, the inter-prediction inhibit target CU determining unit 23 may not set such a CU as an inter-prediction inhibit target CU.

Figure 15A:
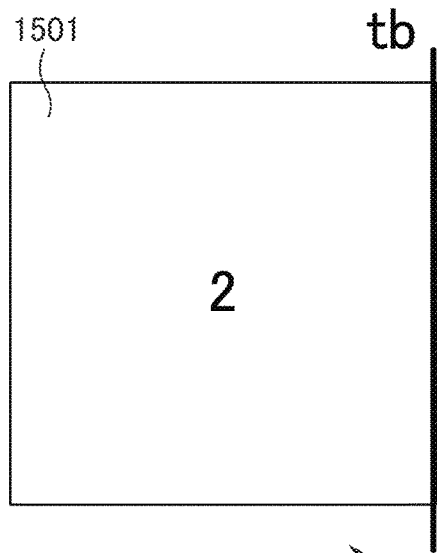
FIGS. 15A and 15D are maps indicating inter-prediction inhibit target CUs when the CU size is 64×64 pixels, 32×32 pixels, 16×16 pixels, and 8×8 pixels, respectively.
Figure 15B:
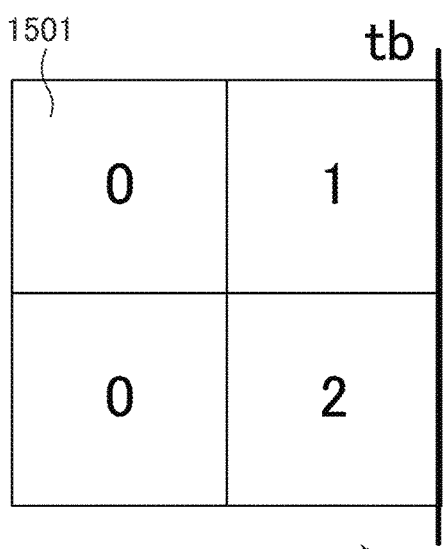
Figure 15C:
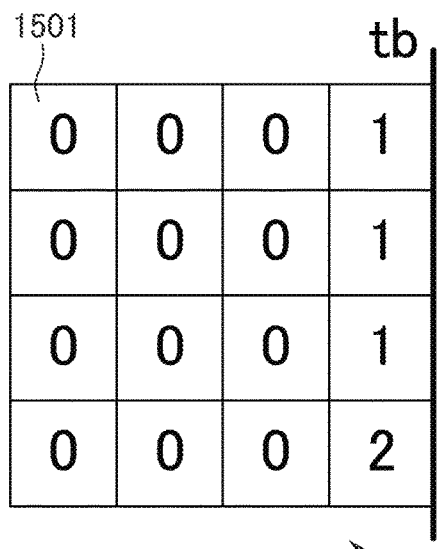
Figure 15D:
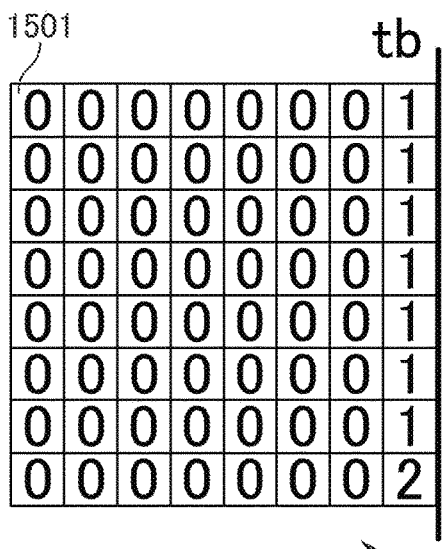

FIGS. 15A and 15D are maps indicating the inter-prediction inhibit target CUs in the CTU 1500 as the inter-prediction inhibit target block when the CU size is 64×64 pixels, 32×32 pixels, 16×16 pixels, and 8×8 pixels, respectively. Each block 1501 represents one CU. Of the numeric values "0" to "2" within each CU, "0" indicates that the CU is not an inter-prediction inhibit target CU. On the other hand, "1" indicates that the CU is an inter-prediction inhibit target CU. Further, "2" indicates that the CU is an inter-prediction inhibit target CU for which, as an exception, the application of the temporal vector mode is not prohibited. As illustrated in FIGS. 5A to 5D, the CUs located at the right edge of the inter-prediction inhibit target block are the inter-prediction inhibit target CUs. However, the CU located at the lower right corner of the inter-prediction inhibit target block is excluded as an exception. To simplify the setting, the inter-prediction inhibit target CU determining unit 23 may treat all the CUs contained in the inter-prediction inhibit target block as the inter-prediction inhibit target CUs.

The inter-prediction inhibit target CU determining unit 23 may limit the selectable CU size. For example, by providing a value indicating a disabled state as a CU inhibiting index, the inter-prediction inhibit target CU determining unit 23 can limit the number of CU divisions to be selected within each CTU. As previously described, the CU is the unit at which the encoding mode is determined, and the video encoding apparatus 1 can select the intra-predictive coding mode or the inter-predictive coding mode as the encoding mode for each CU. Though the details will be described later, there is the possibility that the CU containing the PU to be referred to in the temporal vector mode is intra-predictive encoded. Since the compression efficiency of the intra-predictive coding mode is generally lower than that of the inter-predictive coding mode, it is preferable that the CU size to be employed when the intra-predictive coding mode is applied is set to the smallest size among the selectable CU sizes. For example, the inter-prediction inhibit target CU determining unit 23 is adapted so that a CU for which the application of the temporal vector mode is prohibited (i.e., a CU whose CU inhibiting index is not 0) is selected when the CU size is the smallest, i.e., when CUSIZE is 8. To achieve this, when the CU size is larger than 8, the inter-prediction inhibit target CU determining unit 23 sets the value of the CU inhibiting index of any CU containing the same position as the smallest size CU whose CU inhibiting index is not 0 to a value indicating a disabled state, for example, to "3".

The inter-prediction inhibit target PU determining unit 24 prohibits the application of the temporal vector mode to the PU in the inter-prediction inhibit target CU that can refer, in the temporal vector mode, to the region encoded by another encoder. For convenience of explanation, the PU for which the application of the temporal vector mode is prohibited will hereinafter be referred to as the inter-prediction inhibit target PU.

As illustrated in FIG. 1, in HEVC, the selectable CU size is 64×64 pixels at the maximum, and 32×32 pixels, 16×16 pixels, and 8×8 pixels in a quadtree structure. The CU of each size is divided into a plurality of PUs in accordance with the PU partitioning mode PartMode=2N×2N, N×N, 2N×N, N×2N, 2N×U, 2N×nD, nR×2N, or nL×2N as illustrated in FIG. 1. In other words, the hierarchical CU structure is also applied to the PUs. Therefore, the inter-prediction inhibit target PU is determined for each hierarchical CU structure.

The PU identifying index PUIDX assigned to each PU contained in one CU 1600 will be described below with reference to FIGS. 16A to 16H. FIGS. 16A to 16H indicate the indexes PUIDX when the PU partitioning mode PartMode is 2N×2N, N×N, 2N×N, N×2N, 2N×U, 2N×nD, nR×2N, and nL×2N, respectively. In FIGS. 16A to 16H, each block 1601 represents one PU, and the numeric value within each block indicates the PU index PUIDX. Each numeric value above the CU 1600 indicates the horizontal PU index PUHIDX.

The index PUIDX is assigned to each PU in encoding order. The horizontal PU index PUHIDX is assigned to each PU in sequence from left to right in the horizontal direction.

The inter-prediction inhibit target PU determining unit 24 refers to a CU inhibiting map, i.e., a map of CU inhibiting indexes, that indicates inter-prediction inhibit target CUs, and selects a CU whose CU inhibiting index is "1" or "2" as an attention CU. Then, for each PU contained in the attention CU, the inter-prediction inhibit target PU determining unit 24 determines whether the PU refers, in the temporal vector mode, to a PU contained in the region encoded by another encoder.

More specifically, the inter-prediction inhibit target PU determining unit 24 identifies any PU whose PUHIDX is tb/PUHSIZE from among the PUs contained in the CU whose inhibiting index is "1", and determines the identified PU as being the inter-prediction inhibit target PU. PUHSIZE represents the horizontal size of the PU.

FIGS. 17A to 17H are maps indicating the inter-prediction inhibit target PUs when the PU partitioning mode PartMode is 2N–2N, N×N, 2N×N, N×2N, 2N×U, 2N×nD, nR×2N, and nL×2N, respectively. In FIGS. 17A to 17H, each block 1701 represents one PU. The numeric value within each PU indicates the value of the PU inhibiting flag set for the PU. The value of the PU inhibiting flag is "0" when the PU is not an inter-prediction inhibit target PU. On the other hand, the value of the PU inhibiting flag is set to "1" when the PU is an inter-prediction inhibit target PU. As illustrated in FIGS. 17A and 17H, any PU neighboring on the left side of the tile boundary, i.e., the boundary between different regions to be encoded by different encoders, is set as the inter-prediction inhibit target PU.

When the PU is a PU contained in a CU whose CU inhibiting index is "2", and when there is a CTU boundary between that PU and the PU located to the lower right thereof, the inter-prediction inhibit target PU determining unit 24 may not, as an exception, set the PU as the inter-prediction inhibit target PU (in that case, the value of the PU inhibiting flag for that PU is set to "0"). The reason is that, when there is a CTU boundary between that PU and the PU located to the lower right thereof, the ColPU is set so as to overlap the PU and the prediction vector candidate selected by the temporal vector mode does not refer to the region encoded by another encoder. In this case, the maps indicating the inter-prediction inhibit target PUs when the PU partitioning mode PartMode is 2N×2N, N×N, 2N×N, N×2N, 2N×U, 2N×nD, nR×2N, and nL×2N, respectively, are as illustrated in FIGS. 18A to 18H. In FIGS. 18A to 18H, each block 1801 represents one PU. The numeric value within each PU indicates the value of the PU inhibiting flag set for the PU.

The vector mode determining unit 25 determines the prediction vector for the motion vector of the PU to be encoded. However, in the case of the prediction inhibit target PU, the vector mode determining unit 25 prohibits the application of the temporal vector mode by identifying the vector mode of the inter-prediction mode selectable for the prediction inhibit target PU, and the spatial prediction vectors selected by the spatial vector mode are used as the prediction vector candidates. Then, the vector mode determining unit 25 determines the prediction vector from among the spatial prediction vectors.

Figure 19:
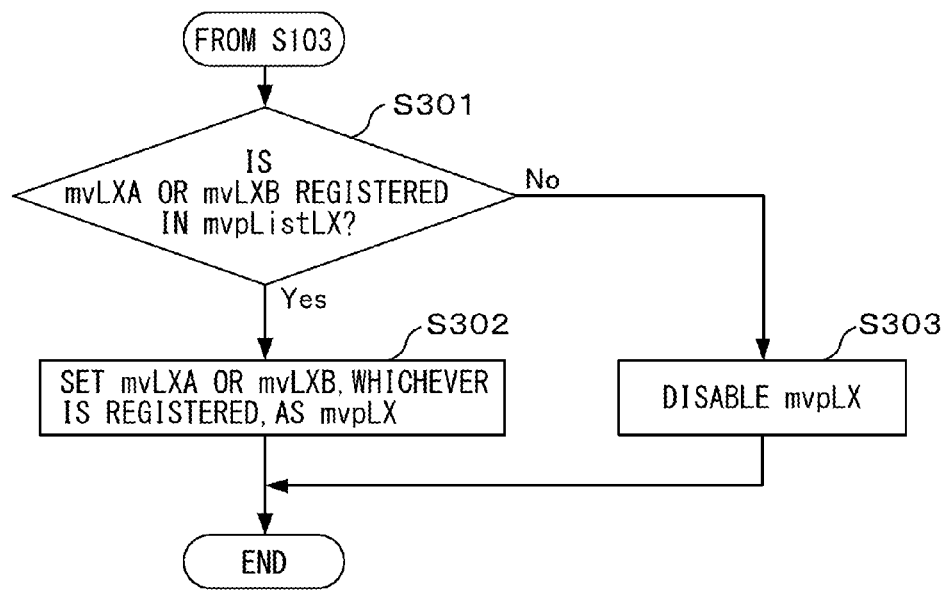
FIG. 19 is an operation flowchart illustrating a procedure for determining a prediction vector for a prediction inhibit target PU in the AMVP mode.

FIG. 19 is an operation flowchart illustrating a procedure by which the vector mode determining unit 25 determines the prediction vector for the prediction inhibit target PU in the AMVP mode. After carrying out the process of steps S101 to S103 in the flowchart of FIG. 3, the vector mode determining unit 25 carries out the process starting from step S301 in FIG. 19. For any PU other than the prediction inhibit target PU, the vector mode determining unit 25 determines the prediction vector in accordance with the flowchart of FIG. 3.

The vector mode determining unit 25 checks to see when mvLXA or mvLXB is registered in the prediction vector candidate list mvpListLX (step S301). When mvLXA or mvLXB is registered in the prediction vector candidate list mvpListLX (Yes in step S301), the vector mode determining unit 25 sets mvLXA or mvLXB, whichever is registered in the prediction vector candidate list mvpListLX, as the prediction vector mvpLX (step S302). When both mvLXA and mvLXB are registered, the vector mode determining unit 25 may select, as the prediction vector mvpLX, mvLXA or mvLXB whichever is smaller in terms of the error relative to the motion vector of the PU to be encoded, i.e., in terms of the amount of information. The vector selected as the prediction vector mvpLX is expressed by the syntax mvpLXFlag which indicates the position of the selected vector in the candidate list mvpListLX. The syntax mvpLX-Flag and the error vector representing the difference between the prediction vector and the motion vector of the PU to be encoded are entropy-encoded.

On the other hand, when neither mvLXA nor mvLXB is registered (No in step S301), the vector mode determining unit 25 disables the prediction vector mvpLX (step S303). After step S302 or S303, the vector mode determining unit 25 terminates the prediction vector determining procedure.

Figure 20:
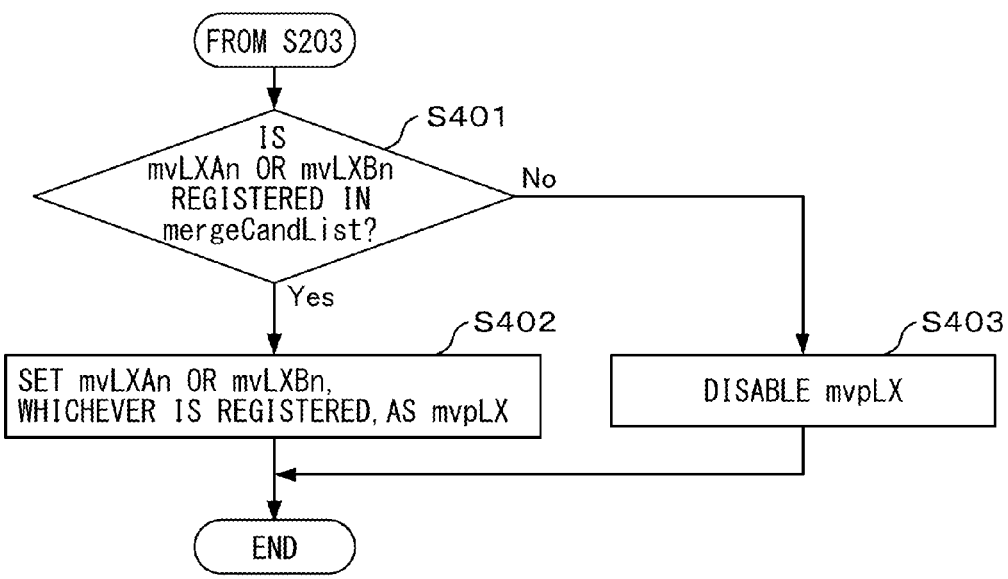
FIG. 20 is an operation flowchart illustrating a procedure for determining a prediction vector for a prediction inhibit target PU in the merge mode.

FIG. 20 is an operation flowchart illustrating a procedure by which the vector mode determining unit 25 determines the prediction vector for the prediction inhibit target PU in the merge mode. After carrying out the process of steps S201 and S203 in the flowchart of FIG. 6, the vector mode determining unit 25 carries out the process starting from step S401 in FIG. 20. For any PU other than the prediction inhibit target PU, the vector mode determining unit 25 determines the prediction vector in accordance with the flowchart of FIG. 6.

After constructing the merge vector candidate list merge-CandList (which contains a maximum of five candidates), the vector mode determining unit 25 checks to see when the spatial prediction vector candidate mvLXAn or mvLXBn selected by the spatial vector mode is registered in the candidate list mergeCandList (step S401). When either mvLXAn or mvLXBn is registered in the prediction vector candidate list mergeCandList (Yes in step S401), the vector mode determining unit 25 sets mvLXAn or mvLXBn, whichever is registered, as the prediction vector mvpLX (step S402). When more than one mvLXAn/mvLXBn is registered, the vector mode determining unit 25 may select, as the prediction vector mvpLX, the registered mvLXAn or mvLXBn that yields the smallest error relative to the motion vector of the PU to be encoded, i.e., the smallest amount of information. The vector selected as the prediction vector mvpLX is expressed by the syntax mergeIdx which indicates the position of the selected vector in the candidate list mergeCandList. The syntax mergeIdx is entropy-encoded.

On the other hand, when neither mvLXAn nor mvLXBn is registered (No in step S401), the vector mode determining unit 25 disables the prediction vector mvpLX (step S403). After step S402 or S403, the vector mode determining unit 25 terminates the prediction vector determining procedure. The vector mode determining unit 25 may perform the prediction vector determining procedure for the PU concurrently with the process that the encoding mode determining unit 26 performs for the PU.

Since the application of the temporal vector mode is prohibited for the prediction inhibit target PU, as earlier described, the process for determining the temporal prediction vector may be omitted. This serves to reduce the amount of computation needed to determine the prediction vector in the case of the prediction inhibit target PU.

The encoding mode determining unit 26 determines the encoding mode for each CU contained in the current picture. Further, the encoding mode determining unit 26 determines the inter-prediction mode for each PU.

When the prediction vector mvpLX is disabled for any particular PU in FIG. 19 or 20, the encoding mode determining unit 26 may decide that the CU containing the particular PU to be encoded by using the intra-predictive coding.

The encoding mode determining unit 26 selects one combination from among the various combinations of the CU partitioning mode (CU size) and the PU partitioning mode for the CTU to be encoded in the current picture, and determines the inter-prediction mode appropriate to the selected combination. Further, for the selected combination, the encoding mode determining unit 26 determines which coding mode, the intra-predictive coding or the inter-predictive coding, is to be applied.

To determine the CU partitioning mode and the PU partitioning mode, the encoding mode determining unit 26 calculates the coding cost, i.e., an estimate of the amount of coding, for each combination of the CU partitioning mode and the PU partitioning mode, and selects the combination that minimizes the coding cost. To calculate the coding cost, the encoding mode determining unit 26 calculates the prediction error, i.e., the sum of the absolute differences between pixels, SAD, in accordance with the following equation.

$$SAD = \Sigma |OrgPixel - PredPixel|$$

where OrgPixel represents the pixel value of the attention block in the current picture, for example, the value of the pixel contained in the PU, and PredPixel is the value of the pixel contained in the prediction block corresponding to the attention block, which is obtained in the HEVC standard. However, instead of calculating SAD, the encoding mode determining unit 26 may calculates, for example, the sum of the absolute transformed differences, SAID, taken between pixels after applying a Hadamard transform to the difference image between the prediction block and the CTU to be encoded.

When the amount of information needed to encode the error vector MVD=(Prediction vector)−(Motion vector) is denoted by MVDCost, the coding cost Cost is expressed by the following equation.

$$Cost = SAD + \lambda * MVDCost$$

where $\lambda$ is a scaler for adjusting the balance between SAD and MVDCost.

Figure 21:
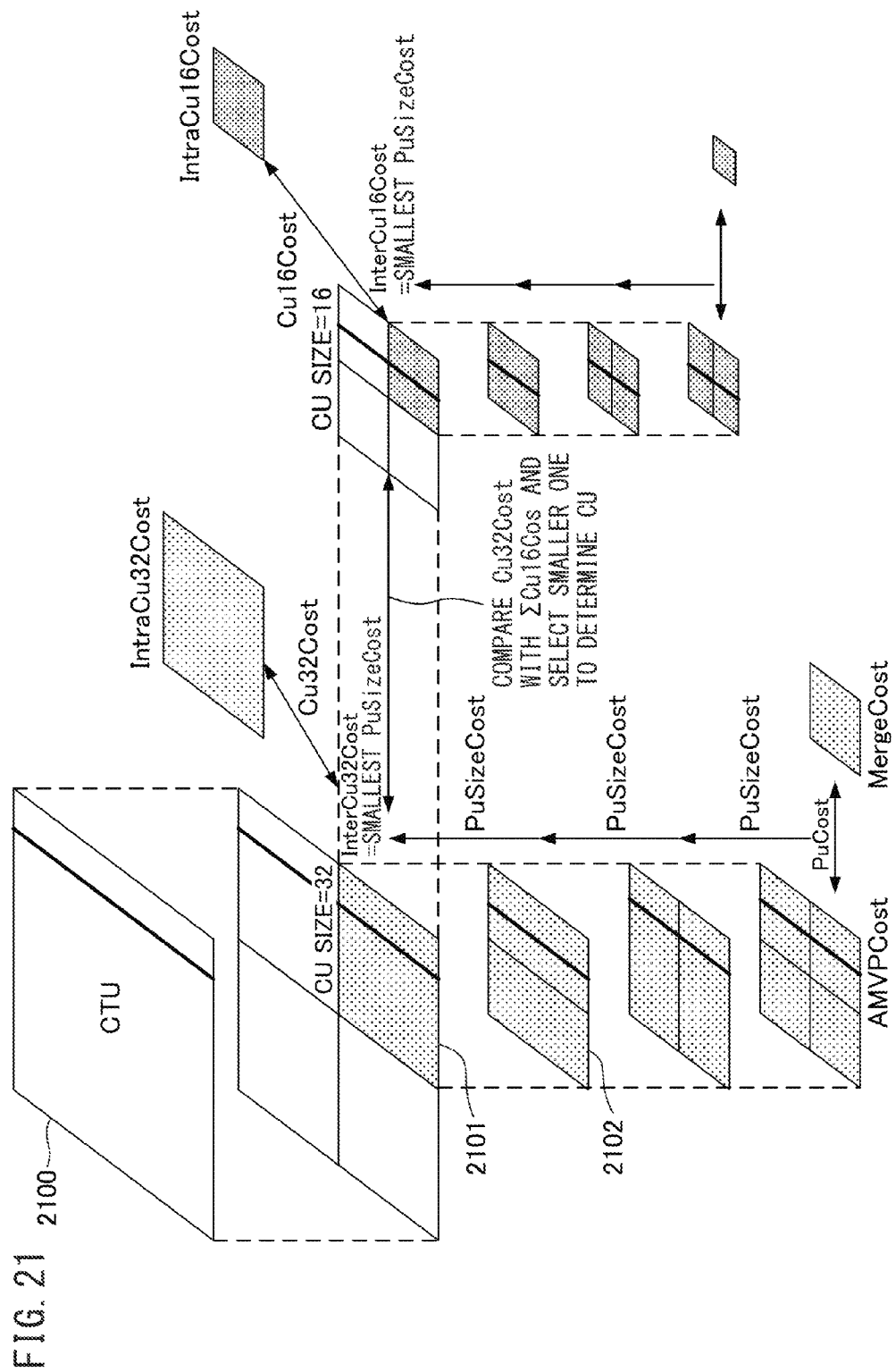
FIG. 21 is a diagram for explaining an encoding mode determining procedure.

Referring to FIG. 21, the process performed by the encoding mode determining unit 26 will be described in further detail below. Since no selection is made for any disabled CU, the encoding mode determining unit 26 does not calculate the coding cost for any combination containing such CUs. For simplicity, the following description is given by assuming that CUSIZE=32 and CUSIZE=16 are enabled.

First, the encoding mode determining unit 26 sets CUSIZE to 32 for the CTU 2100. Then, to obtain the cost PuSizeCost for each PU partitioning mode PartMode in the CU to be encoded, the encoding mode determining unit 26 calculates the PuCost for each PU 2102 contained in the CU 2101. In determining the inter-prediction mode, the encoding mode determining unit 26 calculates the PU cost for each of the AMVP and merge modes. In this case, the encoding mode determining unit 26 uses the prediction vector selected by the vector mode determining unit 25. As earlier described, for the inter-prediction inhibit target PU, the prediction vector is selected from among the spatial prediction vectors selected by the spatial vector mode. In the case of a PU for which the prediction vector is disabled in both the AMVP mode and the merge mode, i.e., in the case of a PU for which there is no spatial prediction vector, the encoding mode determining unit 26 disables the inter-prediction mode, and sets the PU cost PuCost to an invalid value, i.e., to a very large value.

When the AMVP mode is disabled, and the merge mode is enabled, i.e., when the prediction vector is selected from among the spatial prediction vectors in the merge mode, the encoding mode determining unit 26 selects the merge mode as the inter-prediction mode. Then, the encoding mode determining unit 26 takes the merge mode cost MergeCost as the PU cost PuCost. Conversely, when the AMVP mode is enabled, i.e., when the prediction vector is selected from among the spatial prediction vectors in the AMVP mode, and when the merge mode is disabled, the encoding mode determining unit 26 selects the AMVP mode as the inter-prediction mode. Then, the encoding mode determining unit 26 takes the AMVP mode cost AMVPCost as the PU cost PuCost. On the other hand, when the AMVP mode and the merge mode are both enabled, the encoding mode determining unit 26 selects as the inter-prediction mode the AMVP mode or the merge mode whichever is smaller in terms of the mode cost AMVPCost or MergeCost. Then, the encoding mode determining unit 26 takes the smaller cost as the PU cost PuCost.

After calculating the PU cost PuCost for all the PUs contained in the CU, the encoding mode determining unit 26 calculates the sum of the PU costs PuCost of all the PUs contained in the CU, i.e., PuSizeCost=$\Sigma$ PuCost, as the PU partitioning cost for each PU partitioning mode. Then, the encoding mode determining unit 26 selects the PU partitioning mode that yields the smallest PU partitioning cost among all possible PU partitioning modes. The encoding mode determining unit 26 takes the smallest PU partitioning cost as the inter-predictive coding mode cost InterCu32Cost for the attention CU size (in this example, 32).

Further, the encoding mode determining unit 26 calculates the intra-predictive coding mode cost IntraCu32Cost expected to be incurred when encoding the CU of CUSIZE=32 by intra-predictive coding. In this case, the encoding mode determining unit 26 generates prediction blocks, for example, in accordance with a prediction block creation method defined in the HEVC standard and selectable in the intra-predictive coding mode, and calculates the cost for each prediction block in accordance with the earlier given SAD-calculating equation. Then, the encoding mode determining unit 26 determines the cost IntraCu32Cost by selecting the smallest cost among the costs calculated for the respective prediction images.

The encoding mode determining unit 26 selects, as the encoding mode to be applied to the CU size, the intra-predictive coding mode that yields the mode cost IntraCu32Cost or the inter-predictive coding mode that yields the mode cost InterCu32Cost, whichever is smaller in terms of the mode cost. The selected encoding mode is indicated by a flag predModeFlag (=intra-predictive coding mode or inter-predictive coding mode). The encoding mode determining unit 26 takes the smaller cost as the cost Cu32Cost for CUSIZE=32. When any one of the PUs contained in the CU is disabled, InterCu32Cost is set to an invalid value. In this case, the encoding mode determining unit 26 selects the intra-predictive coding mode for the CU of CUSIZE=32.

Next, the encoding mode determining unit 26 sets CUSIZE to 16, and repeats the same process as described above. Lastly, the encoding mode determining unit 26 compares the cost Cu32Cost for CUSIZE=32 with the sum of the costs of the four CUs of CUSIZE=16, and selects the smaller cost. Then, the encoding mode determining unit 26 determines the CU size, PU partitioning mode, and encoding mode (in the case of the inter-predictive coding mode, the inter-prediction mode) corresponding to the smaller cost.

In this way, when there is no spatial prediction vector for any one of the PUs contained in the CU, the encoding mode determining unit 26 determines the intra-predictive coding mode as the encoding mode to be applied to the CU containing such a PU.

According to a modified example, for any CU whose CU inhibiting index is not "0", the encoding mode determining unit 26 may forcefully set the encoding mode for that CU to the intra-predictive coding mode. This serves to reduce the amount of computation needed for the selection of the encoding mode.

The predictive encoding unit 27 generates a prediction block for each PU in accordance with the encoding mode determined by the encoding mode determining unit 26 on a CU-by-CU basis, and generates encoded data for each CU by quantizing the prediction errors between the prediction blocks and the respective PUs.

More specifically, the predictive encoding unit 27 calculates the difference between the PU to be encoded and the prediction block. Then, the predictive encoding unit 27 generates a prediction error signal by taking the difference value obtained by the difference calculation for each pixel in the PU.

The predictive encoding unit 27 orthogonal-transforms the prediction error signal of the TU to be encoded and thereby obtains frequency signals representing the horizontal and vertical frequency components of the prediction error signal. For example, the predictive encoding unit 27 obtains a set of DCT coefficients as the frequency signals for each TU by applying DCT (Discrete Cosine Transform) as the orthogonal transform to the prediction error signal.

Next, the predictive encoding unit 27 quantizes the frequency signals to calculate the quantized coefficients of the frequency signals. The quantization is a process for representing the signal values contained within a given section by one signal value. The size of this given section is referred to as the quantization step size. For example, the predictive encoding unit 27 quantizes each frequency signal by dropping from the frequency signal a predetermined number of low-order bits corresponding to the quantization step size. The quantization step size is determined by a quantization parameter. For example, the predictive encoding unit 27 determines the quantization step size to be used, in accordance with a function that expresses the quantization step size as a function of the value of the quantization parameter. A function monotonically increasing with the value of the quantization parameter may be used as the above function, and this function is set in advance.

Alternatively, a plurality of quantization matrices for defining the quantization step sizes for the horizontal and vertical frequency components are constructed in advance and stored in a memory maintained within the predictive encoding unit 27. Then, in accordance with the quantization parameter, the predictive encoding unit 27 selects a specific quantization matrix from among the quantization matrices stored in the memory. The predictive encoding unit 27 may then determine the quantization step size for each frequency component of the frequency signal by referring to the selected quantization matrix.

The predictive encoding unit 27 may determine the quantization parameter by using one of the various quantization parameter determining methods defined in video coding standards such as HEVC. For example, the predictive encoding unit 27 may use a quantization parameter computing method defined for the MPEG-2 Standard Test Model 5. For the quantization parameter computing method defined for the MPEG-2 Standard Test Model 5, refer, for example, to the URL designated by http://www.mpeg.org/MPEG/MSSG/tm5/Ch10/Ch10.html.

The predictive encoding unit 27 can reduce the amount of information contained in the TU to be encoded, because the number of bits used to represent each frequency component of the frequency signal can be reduced by quantization. The predictive encoding unit 27 supplies the quantized coefficients as encoded data to the entropy encoding unit 28.

Using the quantized coefficients of the TU to be encoded, the predictive encoding unit 27 generates a reference region to be used for encoding subsequent blocks. To that end, the predictive encoding unit 27 inverse-quantizes each quantized coefficient by multiplying it with a predetermined number corresponding to the quantization step size determined by the quantization parameter. By this inverse quantization, the frequency signals of the TU to be encoded, for example, a set of DCT coefficients, are reconstructed. After that, the predictive encoding unit 27 applies an inverse orthogonal transform to the frequency signals. For example, when the frequency signals are computed by the predictive encoding unit 27 using a DCT process, the predictive encoding unit 27 applies an inverse DCT to the reconstructed frequency signals. By thus applying the inverse quantization and inverse orthogonal transform to the quantized signals, the prediction error signal is reconstructed that has approximately the same information as the original prediction error signal.

The predictive encoding unit 27 adds, to the value of each pixel in the prediction block, the reconstructed prediction error signal corresponding to the pixel. By applying the above processing operations to each block, the predictive encoding unit 27 generates a reference block which is used to generate a prediction block for the PU to be encoded thereafter.

Each time a reference block is generated, the predictive encoding unit 27 stores the reference block in a memory maintained within the predictive encoding unit 27.

The memory maintained within the predictive encoding unit 27 temporarily stores the sequentially generated reference blocks. The reference region to be referred to when encoding subsequent pictures is obtained by splicing all the reference blocks contained in the region encoded by one encoder in the same order as the blocks are encoded. The memory maintained within the predictive encoding unit 27 stores a predetermined number of reference regions to which the picture to be encoded may refer; then, as the number of reference regions exceeds the predetermined number, the reference regions are discarded in the same order as they were encoded.

According to a modified example, the video encoding apparatus may include a shared memory that stores a reference picture created by splicing together the reference regions obtained from the respective encoders and that can be accessed from the respective encoders. In this case, since each encoder can use the reference picture to generate the prediction block and motion vector when encoding each CU/PU by inter-predictive coding, the encoder can also use information pertaining to a region contained in the already encoded picture and encoded by another encoder.

The memory maintained within the predictive encoding unit 27 further stores a motion vector for each of the inter-coded reference blocks.

Further, the predictive encoding unit 27 performs block matching between the PU to be encoded and the reference region or reference picture in order to generate the prediction block for inter-coding. Then, the predictive encoding unit 27 obtains the motion vector by determining the reference region or reference picture that best matches the PU to be encoded and the position in the reference region or reference picture.

The predictive encoding unit 27 generates the prediction block in accordance with the encoding mode selected by the encoding mode determining unit 26. When the PU is to be encoded by inter-predictive coding, the predictive encoding unit 27 generates the prediction block by performing motion compensation on the reference region or reference picture by using the motion vector.

On the other hand, when the PU is to be encoded by intra-predictive coding, the predictive encoding unit 27 generates the prediction block from the block adjacent to the PU to be encoded. In this case, the predictive encoding unit 27 generates the prediction block in accordance with the intra-mode determined by the encoding mode determining unit 26 from among, for example, the various intra-modes defined in HEVC.

The entropy encoding unit 28 outputs bitstreams obtained by entropy-encoding the quantized signals, the motion vector prediction error signal, etc. supplied from the predictive encoding unit 27. Then, the control unit (not depicted) splices the output bitstreams in a prescribed order, and appends header information, etc. defined in coding standards such as HEVC, to obtain the encoded video data.

Figure 22:
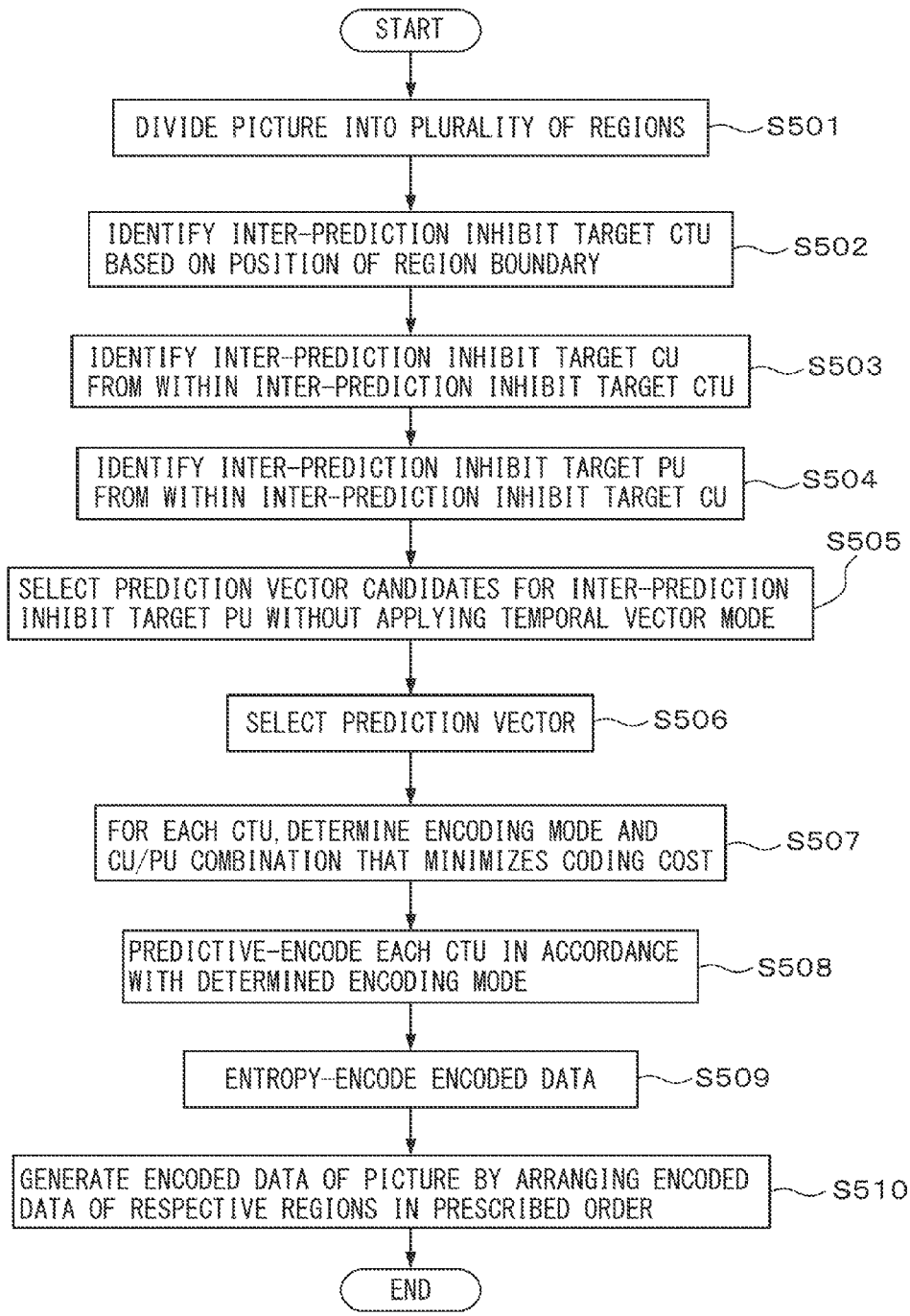
FIG. 22 is an operation flowchart of a video encoding process.

FIG. 22 is an operation flowchart of a video encoding process which is performed by the video encoding apparatus 1. The video encoding apparatus 1 encodes pictures on a picture-by-picture basis in accordance with the following operation flowchart.

The dividing unit 10 divides each picture into a plurality of regions (step S501). Each region contains at least one tile, and the boundary between two adjacent regions defines a tile boundary. Each region is input to a corresponding one of the encoders 11-1 to 11-n. The inter-prediction inhibit target CTU determining unit 22 in the encoder identifies, based on the region boundary, a CTU for which the application of the inter-predictive coding mode is inhibited (step S502).

The inter-prediction inhibit target CU determining unit 23 in the encoder identifies, from within the CTU for which the application of the inter-predictive coding mode is inhibited, a CU for which the application of the inter-predictive coding mode is inhibited (step S503). In the case of a CTU for which the application of the inter-predictive coding mode is not inhibited, the application of the inter-predictive coding mode is not inhibited for any sub-block (CU, PU) contained in that CTU.

Then, the inter-prediction inhibit target PU determining unit 24 in the encoder identifies, from within the CU for which the application of the inter-predictive coding mode is inhibited, a PU for which the application of the inter-predictive coding mode is inhibited (step S504). In the case of a CU for which the application of the inter-predictive coding mode is not inhibited, the application of the inter-predictive coding mode is not inhibited for any PU contained in the CU.

In the case of a PU for which the application of the temporal vector mode is prohibited, the vector mode determining unit 25 in the encoder selects prediction vector candidates without applying the temporal vector mode. On the other hand, in the case of a PU for which the application of the temporal vector mode is not prohibited, the vector mode determining unit 25 selects prediction vector candidates by applying the temporal vector mode (step S505). Then, the vector mode determining unit 25 selects the prediction vector for each PU from among the prediction vector candidates (step S506).

The encoding mode determining unit 26 in the encoder determines, for each CTU, the encoding mode to be applied and the CU/PU combination that minimizes the coding cost (step S507). In the case of a CU containing a PU for which the application of the inter-predictive coding mode is inhibited, the encoding mode determining unit 26 calculates the coding cost without using any prediction vector candidates selected by the temporal vector mode. Further, the encoding mode determining unit 26 determines the CU/PU combination so as not to select any disabled CU.

The predictive encoding unit 27 in the encoder predictive-encodes each CTU in accordance with the determined encoding mode (step S508). Then, the entropy encoding unit 28 in the encoder entropy-encodes the encoded data obtained by predictive encoding (step S509). The entropy-encoded encoded data from the encoder is supplied to the multiplexing unit 12.

The multiplexing unit 12 which received the encoded data of the respective regions from the respective encoders 11-1 to 11-n arranges the encoded data in a prescribed order, for example, in raster scan order, and generates encoded data for one picture by appending prescribed header information conforming to HEVC (step S510). Then, the multiplexing unit 12 outputs the encoded data of each picture in accordance with a prescribed picture sequence. After step S510, the video encoding apparatus 1 terminates the video encoding process.

As has been described above, the video encoding apparatus divides each picture into a plurality of regions with region boundaries defining the tile boundaries, and encodes the respective regions by using different encoders. Then, each encoder in the video encoding apparatus identifies, from among the PUs contained in the region to be encoded by the encoder, a PU that may select as the prediction vector candidate the motion vector of a block contained in the region encoded by another encoder. Then, the video encoding apparatus prohibits the application of the temporal vector mode to the identified PU, so that the motion vector used to determine the temporal prediction vector need not be shared among the encoders. Thus, the video encoding apparatus eliminates the need for a memory for storing the motion vectors to be shared among the encoders.

Next, a video encoding apparatus according to a second embodiment will be described. In the video encoding apparatus according to the second embodiment, a flag that indicates whether a block that may be referred to by another encoder when the temporal vector mode is applied has been intra-predictive encoded or inter-predictive encoded is shared among the encoders. The block that may be referred to by another encoder when the temporal vector mode is applied will hereinafter be referred to as the referenced block. Then, for any PU that may select the motion vector of a block contained in the region encoded by another encoder, the encoder examines the flag of the referenced block. When the referenced block is inter-predictive encoded, the encoder generates a dummy temporal prediction vector as a prediction vector candidate, but selects the prediction vector from among other prediction vector candidates than the dummy temporal prediction vector.

Figure 23:
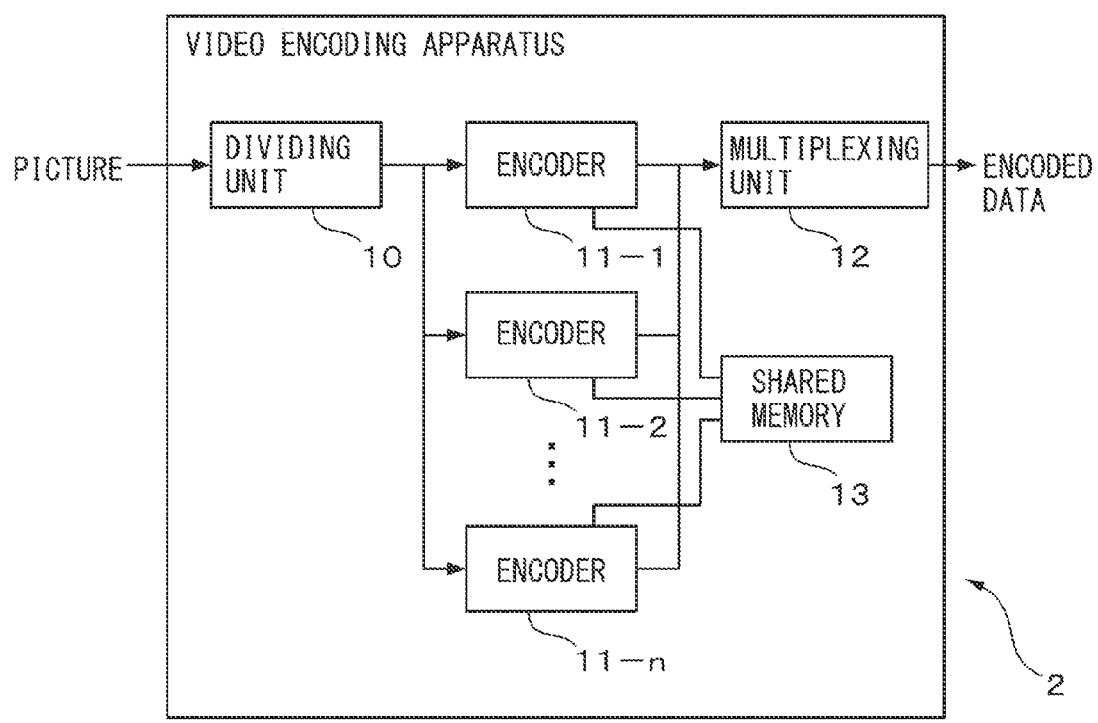
FIG. 23 is a diagram schematically illustrating the configuration of a video encoding apparatus according to a second embodiment.

FIG. 23 is a diagram schematically illustrating the configuration of the video encoding apparatus according to the second embodiment. The video encoding apparatus 2 includes a dividing unit 10, a plurality of encoders 11-1 to 11-n (n is an integer not smaller than 2), a multiplexing unit 12, and a shared memory 13. The video encoding apparatus of the second embodiment differs from the video encoding apparatus of the first embodiment in that the shared memory 13 is provided and in that part of the processing performed by each encoder is different from that of the first embodiment. The following therefore describes the shared memory 13 and the processing that each encoder performs in conjunction with the shared memory 13. For the other component elements of the video encoding apparatus of the second embodiment, refer to the description earlier given of the corresponding component elements of the first embodiment.

The shared memory 13 includes, for example, a readable/writable volatile semiconductor memory circuit. The shared memory 13 is accessible from any of the encoders 11-1 to 11-n, and stores information to be shared among the encoders 11-1 to 11-n. The shared information is, for example, a flag predModeFlag which indicates whether the referenced block is intra-predictive encoded or inter-predictive encoded. The flag predModeFlag is one example of the encoding mode information. The referenced block is a block that serves as ColPU for a PU that is adjacent on the left side of a region containing the referenced block and that is contained in a region encoded by another encoder. In other words, for each block of, for example, 16×16 pixels, whose left edge contacts a region boundary, the flag predModeFlag is output from the encoding mode determining unit 26 in the encoder, and is stored in the shared memory 13. Since the flag predModeFlag is represented by one bit, it follows that one-bit information is shared among the encoders for each 16×16 pixel block whose left edge contacts a region boundary.

When determining the prediction vector for the prediction inhibit target PU, the vector mode determining unit 25 in the encoder examines the flag predModeFlag of the ColPU located across the region boundary from the prediction inhibit target PU and contained in the region encoded by another encoder. When the ColPU is intra-predictive encoded, there is no temporal prediction vector for the prediction inhibit target PU; therefore, the vector mode determining unit 25 determines the prediction vector in the same manner as for a PU that is not a prediction inhibit target PU. On the other hand, when the ColPU is inter-predictive encoded, there is a temporal prediction vector for the prediction inhibit target PU. Therefore, the vector mode determining unit 25 registers a dummy temporal prediction vector in the prediction vector candidate list. Then, after completing the prediction vector candidate list, the vector mode determining unit 25 determines the prediction vector by selecting from the list a prediction vector candidate other than the dummy temporal prediction vector.

For example, in the AMVP mode, the vector mode determining unit 25 registers the dummy temporal prediction vector in the candidate list mvpListLX in step S106 in the flowchart of FIG. 3. Since the temporal prediction vector is no more than one candidate, the candidate list mvpListLX completed before proceeding to step S109 invariably contains a selectable prediction vector candidate other than the dummy temporal prediction vector. Therefore, in step S109, the vector mode determining unit 25 determines the prediction vector mvpLX by selecting the vector other than the dummy temporal prediction vector from the two prediction vector candidates registered in the candidate list mvpListLX. Then, the vector mode determining unit 25 sets the syntax mvpLxFlag to indicate the position of the element at which the selected vector is stored in the candidate list mvpListLX.

Similarly, in the merge mode, when the ColPU is inter-predictive encoded, the combined bi-predictive vector mode is executed, and the temporal prediction vector may become the prediction vector. Therefore, in the merge mode, when the ColPU is inter-predictive encoded, no temporal prediction vector is created in step S202 in the flowchart of FIG. 6, and in step S203, no temporal prediction vector is registered in the candidate list mergeCandList. Further, in step S206, a combined bi-predictive vector that uses the temporal prediction vector is not obtained, and such a combined bi-predictive vector is therefore not registered in the candidate list mergeCandList. Then, in step S209, the vector mode determining unit 25 selects the candidate that minimizes the error from among the usable merge vector candidates that are registered in the candidate list mergeCandList and the number of which (five at maximum) is specified by MaxNumMergeCand, and takes the selected candidate as the merge vector mvLXN. Then, the vector mode determining unit 25 sets the syntax mergeIdx to indicate the position of the element at which the selected vector is stored in the candidate list mergeCandList. In other words, according to the second embodiment, the prediction vector candidate determined from the temporal prediction vector or zero vector is selected as the prediction vector.

As has been described above, the video encoding apparatus according to the second embodiment shares the flag predModeFlag of the referenced block among the respective encoders. Accordingly, the video encoding apparatus can increase the number of prediction vector candidates or the number of selectable prediction modes, compared with the case where the application of the temporal vector mode is simply prohibited for any PU that may select the motion vector of a block contained in the tile encoded by another encoder. Since this allows the video encoding apparatus to select a more appropriate prediction vector or prediction mode, the video reproduction quality can be enhanced. Furthermore, since the video encoding apparatus need only share one-bit flag predModeFlag for each block whose left edge contacts a tile boundary, the memory capacity needed to store the shared information can be reduced, compared with the case where the motion vectors of such blocks are shared among the encoders.

Figure 24:
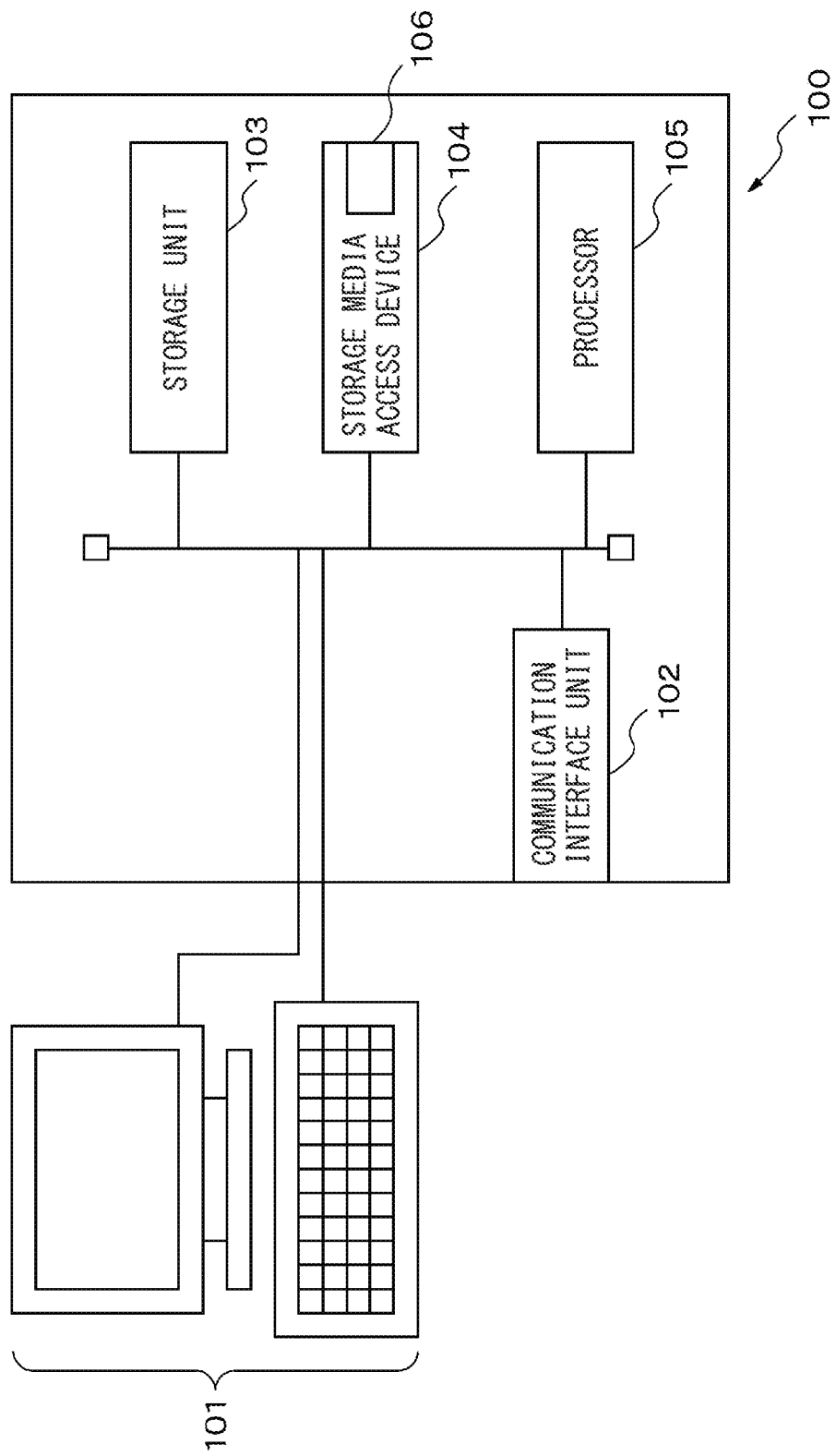
FIG. 24 is a diagram illustrating the configuration of a computer that operates as the video encoding apparatus by executing a computer program for implementing the functions of the various units constituting the video encoding apparatus according to any one of the above embodiments or their modified examples.

FIG. 24 is a diagram illustrating the configuration of a computer that operates as the video encoding apparatus by executing a computer program for implementing the functions of the various units constituting the video encoding apparatus according to any one of the above embodiments or their modified examples.

The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and mouse and a display device such as a liquid crystal display. Alternatively, the user interface unit 101 may include a device, such as a touch panel display, into which an input device and a display device are integrated. The user interface unit 101 generates, for example, in response to a user operation, an operation signal for selecting the video data to be encoded, and supplies the operation signal to the processor 105.

The communication interface unit 102 may include a communication interface for connecting the computer 100 to a video data generating apparatus such as a video camera, and a control circuit for the communication interface. Such a communication interface may be, for example, a Universal Serial Bus (USB) interface.

Further, the communication interface unit 102 may include a communication interface for connecting to a communication network conforming to a communication standard such as the Ethernet (registered trademark), and a control circuit for the communication interface.

In this case, the communication interface unit 102 acquires video data to be encoded from another apparatus connected to the communication network, and passes the data to the processor 105. The communication interface unit 102 may receive encoded video data from the processor 105 and may transmit the data to another apparatus via the communication network.

The storage unit 103 includes, for example, a readable/writable semiconductor memory and a read-only semiconductor memory. The storage unit 103 stores a computer program for implementing the video encoding process to be executed on the processor 105, and also stores data generated as a result of or during the execution of the program.

The storage media access device 104 is a device that accesses a storage medium 106 such as a magnetic disk, a semiconductor memory card, or an optical storage medium. The storage media access device 104 accesses the storage medium 106 to read out, for example, the video encoding computer program to be executed on the processor 105, and passes the readout computer program to the processor 105.

The processor 105 generates the encoded video data by executing the video encoding computer program according to any one of the above embodiments or their modified examples. The processor 105 passes the encoded video data thus generated to the storage unit 103 for storing therein, or transmits the encoded video data to another apparatus via the communication interface unit 102.

A computer program executable on a processor to implement the functions of the various units constituting the video encoding apparatus 1 may be provided in the form recorded on a computer readable recording medium. The term "recording medium" here does not include a carrier wave.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A video encoding apparatus for encoding a picture contained in video data, comprising:
   a dividing processor configured to divide the picture into a plurality of regions;
   a plurality of encoding processors each of which encodes a corresponding one of the plurality of regions to generate encoded data; and
   a multiplexing processor configured to take as inputs the encoded data output from the plurality of encoding processors, and generates encoded data of the picture by arranging the input encoded data in a prescribed order, and wherein:
   a first encoding processor of the plurality of encoding processors: is configured to:
   identify as a first inhibit target sub-block a first sub-block that is contained in a first region to be encoded by the first encoding processor, the first region being among the plurality of regions, and that may select a motion vector of a referenced block contained in a second region encoded by a second encoding processor of the plurality of encoding processors, the second region being among the plurality of regions in another picture already encoded, as a prediction vector for the motion vector of the first sub-block when encoding the first sub-block by using an inter-predictive coding mode that refers to the picture already encoded;
   generate encoded data by encoding a second inhibit target sub-block either by using the inter-predictive coding mode by selecting as the prediction vector a motion vector other than the motion vector of the referenced block selected for the first inhibit target sub-block or by using an intra-predictive coding mode that refers only to the picture being encoded, wherein the second inhibit target sub-block is a second sub-block containing the first inhibit target sub-block and is selected from among a plurality of second sub-blocks into which the first region is divided and at each of which a decision is made as to whether to apply the inter-predictive coding mode or the intra-predictive coding mode; and
   entropy-encode the encoded data.

2. The video encoding apparatus according to claim 1, wherein the first encoding processor is further configured to:
   set, when any one of already encoded blocks located within a prescribed range of the first inhibit target sub-block is encoded by using the inter-predictive coding mode, the motion vector of the already encoded block as the prediction vector;
   disable, when every one of the already encoded blocks located within the prescribed range is encoded by using the intra-predictive coding mode, the prediction vector; and
   encode, when the prediction mode for any one of the first inhibit target blocks contained in the second inhibit target block is disabled, the second inhibit target block by using the intra-predictive coding mode;
   calculate, when the prediction vector is set for every one of the first inhibit target blocks contained in the second inhibit target block, a first estimate of the amount of coding expected to occur when the second inhibit target block is encoded by using the intra-predictive coding mode and a second estimate of the amount of coding expected to occur when the second inhibit target block is encoded by using the inter-predictive coding mode, wherein
   when the first estimate is smaller than the second estimate, the generating the encoded data includes encoding the second inhibit target block by using the intra-predictive coding mode and, when the second estimate is smaller than the first estimate, the generating the encoded data includes encoding the second inhibit target block by using the inter-predictive coding mode.

3. The video encoding apparatus according to claim 1, further comprising a shared memory which is accessible from both the first encoding processor and the second encoding processor, wherein
   the second encoding processor is configured to store, in the shared memory, encoding mode information that indicates whether the referenced sub-block is encoded by using the inter-predictive coding mode or the intra-predictive coding mode, and wherein:
   the first encoding processor is further configured to:
   generate, when the encoding mode information stored in the shared memory indicates that the referenced sub-block is encoded by using the inter-predictive coding mode, a dummy vector as one of candidates for the prediction mode;

select a candidate other than the one prediction vector candidate as the prediction vector from among the motion vectors of already encoded blocks located within a prescribed range of the first inhibit target sub-block and a zero vector whose magnitude is zero;

select, when the encoding mode information stored in the shared memory indicates that the second sub-block is encoded by using the intra-predictive coding mode, the prediction vector from among the motion vectors of the already encoded blocks located within the prescribed range of the first inhibit target sub-block and the zero vector whose magnitude is zero; and calculate a first estimate of the amount of coding expected to occur when the second inhibit target block is encoded by using the intra-predictive coding mode and a second estimate of the amount of coding expected to occur when the second inhibit target block is encoded by using the inter-predictive coding mode, wherein when the first estimate is smaller than the second estimate, the generating the encoded data includes encoding the second inhibit target block by using the intra-predictive coding mode and, when the second estimate is smaller than the first estimate, the generating the encoded data includes encoding the second inhibit target block by using the inter-predictive coding mode.

4. The video encoding apparatus according to claim 2, wherein the identifying the first inhibit target sub-block includes:

identifying a block contacting a boundary between the first and second regions as an inter-prediction inhibit target block from among a plurality of blocks into which the first region is divided and at each of which encoding is performed, each of the blocks containing at least one second sub-block; and identifying as the second inhibit target sub-block the second sub-block containing the first inhibit target sub-block from among the second sub-blocks contained in the inter-prediction inhibit target block.

5. The video encoding apparatus according to claim 4, wherein the second sub-block has a size selectable from a plurality of sizes, and wherein the identifying the second inhibit target sub-block includes identifying the second inhibit target sub-block in the inter-prediction inhibit target block for each of the plurality of sizes, and the generating the encoded data includes determining the size of the second sub-block and the encoding mode to be applied to the inter-prediction inhibit target block so as to minimize the amount of coding of the inter-prediction inhibit target block from among combinations of the plurality of sizes, the intra-predictive coding mode, and the inter-predictive coding mode.

6. The video encoding apparatus according to claim 5, wherein the generating the encoded data includes setting the size of the second inhibit target sub-block to the smallest size selectable from among the plurality of sizes for the second sub-block.

7. The video encoding apparatus according to claim 4, wherein the boundary between the first and second regions is a boundary defined in a vertical direction.

8. A video encoding method comprising:

dividing a picture contained in video data into a plurality of regions by a divider;

generating encoded data by encoding the plurality of regions independently of each other by each of a plurality of encoders; and generating encoded data of the picture by arranging the encoded data of the plurality of regions in a prescribed order by a multiplexer, and wherein:

encoding a first region of the plurality of regions by a first encoder of the plurality of encoders includes:

identifying as a first inhibit target sub-block a first sub-block that is contained in the first region and that may select a motion vector of a referenced block contained in a second region of the plurality of regions in another picture already encoded by a second encoder of the plurality of encoders, as a prediction vector for the motion vector of the first sub-block when encoding the first sub-block by using an inter-predictive coding mode that refers to the picture already encoded;

generating encoded data by encoding a second inhibit target sub-block either by using the inter-predictive coding mode by selecting as the prediction vector a motion vector other than the motion vector of the referenced block selected for the first inhibit target sub-block or by using an intra-predictive coding mode that refers only to the picture being encoded, wherein the second inhibit target sub-block is a second sub-block containing the first inhibit target sub-block and is selected from among a plurality of second sub-blocks into which the first region is divided and at each of which a decision is made as to whether to apply the inter-predictive coding mode or the intra-predictive coding mode; and entropy-encoding the encoded data.

9. The video encoding method according to claim 8, further comprising:

setting, by the first encoder, when any one of already encoded blocks located within a prescribed range of the first inhibit target sub-block is encoded by using the inter-predictive coding mode, the motion vector of the already encoded block as the prediction vector;

disabling, by the first encoder, when every one of the already encoded blocks located within the prescribed range is encoded by using the intra-predictive coding mode, the prediction vector;

encoding, by the first encoder, when the prediction mode for any one of the first inhibit target blocks contained in the second inhibit target block is disabled, the second inhibit target block by using the intra-predictive coding mode;

calculating, by the first encoder, when the prediction vector is set for every one of the first inhibit target blocks contained in the second inhibit target block, a first estimate of the amount of coding expected to occur when the second inhibit target block is encoded by using the intra-predictive coding mode and a second estimate of the amount of coding expected to occur when the second inhibit target block is encoded by using the inter-predictive coding mode; and wherein:

when the first estimate is smaller than the second estimate, the generating the encoded data encodes the second inhibit target block by using the intra-predictive coding mode and, when the second estimate is smaller than the first estimate, the generating the encoded data encodes the second inhibit target block by using the inter-predictive coding mode.

10. The video encoding method according to claim 8, further comprising:

storing, by the second encoder, in a shared memory which is accessible from both the first encoder and the second encoder, encoding mode information that indicates whether the referenced sub-block is encoded by using the inter-predictive coding mode or the intra-predictive coding mode;

generating, by the first encoder, when the encoding mode information stored in the shared memory indicates that the referenced sub-block is encoded by using the inter-predictive coding mode, a dummy vector as one of candidates for the prediction mode;

selecting, by the first encoder, a candidate other than the one prediction vector candidate as the prediction vector from among the motion vectors of already encoded blocks located within a prescribed range of the first inhibit target sub-block and a zero vector whose magnitude is zero;

selecting, by the first encoder, when the encoding mode information stored in the shared memory indicates that the second sub-block is encoded by using the intra-predictive coding mode, the prediction vector from among the motion vectors of the already encoded blocks located within the prescribed range of the first inhibit target sub-block and the zero vector whose magnitude is zero; and calculating, by the first encoder, a first estimate of the amount of coding expected to occur when the second inhibit target block is encoded by using the intra-predictive coding mode and a second estimate of the amount of coding expected to occur when the second inhibit target block is encoded by using the inter-predictive coding mode; and wherein:

when the first estimate is smaller than the second estimate, the generating the encoded data encodes the second inhibit target block by using the intra-predictive coding mode and, when the second estimate is smaller than the first estimate, the generating the encoded data encodes the second inhibit target block by using the inter-predictive coding mode.

11. The video encoding method according to claim 9, wherein the identifying the first inhibit target sub-block includes:

identifying a block contacting a boundary between the first and second regions as an inter-prediction inhibit target block from among a plurality of blocks into which the first region is divided and at each of which encoding is performed, each of the blocks containing at least one second sub-block; and identifying as the second inhibit target sub-block the second sub-block containing the first inhibit sub-block from among the second sub-blocks contained in the inter-prediction inhibit target block.

12. The video encoding method according to claim 11, wherein the second sub-block has a size selectable from a plurality of sizes, and wherein the identifying the second inhibit target sub-block identifies the second inhibit target sub-block in the inter-prediction inhibit target block for each of the plurality of sizes, and the generating the encoded data determines the size of the second sub-block and the encoding mode to be applied to the inter-prediction inhibit target block so as to minimize the amount of coding of the inter-prediction inhibit target block from among combinations of the plurality of sizes, the intra-predictive coding mode, and the inter-predictive coding mode.

13. The video encoding method according to claim 12, wherein the generating the encoded data sets the size of the second inhibit target sub-block to the smallest size selectable from among the plurality of sizes for the second sub-block.

14. The video encoding method according to claim 11, wherein the boundary between the first and second regions is a boundary defined in a vertical direction.

15. A non-transitory computer-readable recording medium having recorded thereon a video encoding computer program that causes a computer to execute a process comprising:

dividing a picture contained in video data into a plurality of regions;

generating encoded data by encoding the plurality of regions independently of each other; and generating encoded data of the picture by arranging the encoded data of the plurality of regions in a prescribed order, and wherein:

encoding a first one of the plurality of regions includes:

identifying as a first inhibit target sub-block a first sub-block that is contained in the first region and that may select a motion vector of a referenced block contained in a second one of the plurality of regions in another picture already encoded, as a prediction vector for the motion vector of the first sub-block when encoding the first sub-block by using an inter-predictive coding mode that refers to the picture already encoded;

generating encoded data by encoding a second inhibit target sub-block either by using the inter-predictive coding mode by selecting as the prediction vector a motion vector other than the motion vector of the referenced block selected for the first inhibit target sub-block or by using an intra-predictive coding mode that refers only to the picture being encoded, wherein the second inhibit target sub-block is a second sub-block containing the first inhibit sub-block and is selected from among a plurality of second sub-blocks into which the first region is divided and at each of which a decision is made as to whether to apply the inter-predictive coding mode or the intra-predictive coding mode; and entropy-encoding the encoded data.

16. A video encoding apparatus for encoding a picture contained in video data, comprising:

a processor configured to:

identify as a first inhibit target sub-block a first sub-block that is contained in a first region to be encoded by the processor, the first region being among a plurality of regions into which the picture is divided, and that may select a motion vector of a referenced block contained in a second region encoded by an another processor, the second region being among the plurality of regions in another picture already encoded, as a prediction vector for the motion vector of the first sub-block when encoding the first sub-block by using an inter-predictive coding mode that refers to the picture already encoded;

generate encoded data by encoding a second inhibit target sub-block either by using the inter-predictive coding mode by selecting as the prediction vector a motion vector other than the motion vector of the referenced block selected for the first inhibit target sub-block or by using an intra-predictive coding mode that refers only to the picture being encoded, wherein the second inhibit target sub-block is a second sub-block containing the first inhibit target sub-block and is selected from among a plurality of second sub-blocks into which the first region is divided and at each of which a decision is made as to whether to apply the inter-predictive coding mode or the intra-predictive coding mode; and
entropy-encode the encoded data.

* * * * *